(12) United States Patent
Ichikawa

(10) Patent No.: US 7,897,237 B2
(45) Date of Patent: Mar. 1, 2011

(54) HONEYCOMB STRUCTURE AND METHOD OF MANUFACTURING THE SAME

(75) Inventor: Yukihito Ichikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 502 days.

(21) Appl. No.: 11/889,146

(22) Filed: Aug. 9, 2007

(65) Prior Publication Data
US 2009/0011176 A1 Jan. 8, 2009

Related U.S. Application Data

(63) Continuation of application No. PCT/JP2006/304653, filed on Mar. 9, 2006.

(30) Foreign Application Priority Data

Mar. 10, 2005 (JP) ............................ 2005-067583

(51) Int. Cl.
*B32B 3/12* (2006.01)
*B01D 39/06* (2006.01)

(52) U.S. Cl. ..................... 428/116; 428/117; 428/118; 55/523; 55/524; 55/521

(58) Field of Classification Search .................. 428/116
See application file for complete search history.

(56) References Cited

U.S. PATENT DOCUMENTS

| | | | |
|---|---|---|---|
| 4,786,542 A | 11/1988 | Yasuda et al. | |
| 5,316,710 A | 5/1994 | Tasaki et al. | |
| 6,479,129 B1 * | 11/2002 | Kar et al. | 428/116 |
| 6,797,666 B2 * | 9/2004 | Harada et al. | 502/180 |
| 7,438,967 B2 * | 10/2008 | Fujita | 428/116 |
| 2006/0105139 A1 * | 5/2006 | Suwabe et al. | 428/116 |

FOREIGN PATENT DOCUMENTS

| | | |
|---|---|---|
| JP | A 61-004813 | 1/1986 |
| JP | U 61-010917 | 1/1986 |
| JP | A-62-202870 | 9/1987 |
| JP | A-01-194916 | 8/1989 |
| JP | A-01-258715 | 10/1989 |
| JP | A-02-199067 | 8/1990 |
| JP | A-05-085834 | 4/1993 |
| JP | A-08-119750 | 5/1996 |
| JP | A 09-155189 | 6/1997 |
| JP | 2004-148791 | * 5/2004 |

* cited by examiner

*Primary Examiner*—Gordon R Baldwin
(74) *Attorney, Agent, or Firm*—Oliff & Berridge, PLC

(57) ABSTRACT

A tubular honeycomb structure 1 comprising partition walls 2 which define and form a plurality of cells 3 each functioning as a fluid passage extending from one end face 4 of honeycomb structure to other end face 5, wherein the areas of the sections of the individual cells 3 (cell sections) normal to the flow direction A of fluid are so made as to be approximately equal to each other over a given range of the center of each cell and its vicinity in the fluid flow direction A and to gradually decrease or gradually increase at each cell end of at least one end face 4 of honeycomb structure in the fluid flow direction A. This honeycomb structure can reduce the incoming loss and outgoing loss of a fluid such as exhaust gas or the like and can show a lower pressure loss.

12 Claims, 19 Drawing Sheets

HONEYCOMB STRUCTURE AND METHOD OF MANUFACTURING THE SAME

This is a Continuation of International Application No. PCT/JP2006/304653 filed Mar. 9, 2006, which claims the benefit of Japanese Application No. 2005-067583 filed Mar. 10, 2005. The disclosures of the prior applications are hereby incorporated by reference herein in their entirety.

TECHNICAL FIELD

The present invention relates to a honeycomb structure and a method for manufacturing the honeycomb structure. More particularly, the present invention relates to a honeycomb structure suitably used as a carrier of catalyst for purification and a carrier of catalyst for deodorization of internal combustion engine exhaust gas including automobile exhaust gas, a filter for filter equipment, a heat exchanger unit, or a carrier for chemical reactor, for example, a carrier of reforming catalyst for fuel cell, as well as to a method for manufacturing such a honeycomb structure.

BACKGROUND ART

A honeycomb structure is mounted as a catalyst carrier in a catalytic converter used for treating harmful components [hydrocarbons (HC), carbon monoxide (CO) and nitrogen oxides (NOx)] contained in an exhaust gas emitted from gasoline engine. A large amount of particulate matter composed mainly of soot (black smoke of carbon) is contained in an exhaust gas emitted from diesel engine, gasoline lean-burn engine or direct injection gasoline engine; discharge of the particulate matter into the air induces environmental pollution; therefore, a honeycomb filter is mounted in the exhaust system of diesel engine for capturing of the particulate matter. A honeycomb structure is used in such a honeycomb filter as well.

The honeycomb structure used for such purposes comprises a large number of through-holes (cells) defined by porous partition walls and extending in the axial direction of honeycomb structure. An exhaust gas passes through the cells and is treated by the catalyst component supported on the partition walls defining the cells. As the honeycomb structure, there is generally used a cordierite-based ceramic honeycomb structure or silicon carbide-based ceramic honeycomb structure which is formed by extrusion and supplied inexpensively in a large amount. Or, there is used a metal-made honeycomb structure obtained by winding a thin flat plate and a wavy plate alternately into a corrugated shape (see, for example, Patent Literature 1 or 2).

As the form of the filter, there is mentioned a form wherein the ends of given cells are plugged at one end face of honeycomb structure and the ends of residual cells are plugged at other end face, or a form wherein plugging is made only at one end face. A fluid such as an exhaust gas enters those cells which are not plugged at the inlet side end face of filter and are plugged at the outlet side end face, passes through the porous partition walls, moves into those cells which are plugged at the inlet side end face and are not plugged at the outlet side end face, and is discharged. At this time, the partition walls function as a filter layer, and the particulate matter such as soot contained in the exhaust gas is captured by the partition walls and deposits thereon.

In conventional honeycomb structures, the cells have had about the same size at all cell sections normal to their lengthwise direction (the flow direction of fluid) and, accordingly, the partition walls defining adjacent cells have been approximately parallel. Also, the outer diameter of honeycomb structure has been generally about the same over the entire lengthwise direction (the flow direction of fluid). Unlike the honeycomb structure having such a shape, there is also proposed a honeycomb structure wherein the size of cell section is gradually changed over the entire length of honeycomb structure from the inlet side end face to the outlet side end face (see, for example, Patent Literature 3).

Patent Literature 1: JP-A-1997-155189
Patent Literature 2: JUM-A-1986-10917
Patent Literature 3: JP-A-1986-4813

However, in the above-mentioned honeycomb structure wherein the section of cell normal to the flow direction of fluid (this section may hereinafter be referred to as "cell section") has about the same area over the entire flow direction, there is a problem of the high pressure loss caused by the fluid incoming resistance at the inlet side end face of honeycomb structure and the fluid outgoing resistance at the outlet side end face. In order to respond to the recent stricter regulation for exhaust gas, there is a trend of allowing a honeycomb structure to have a higher cell density for increased surface area and, accordingly, there is a tendency of an increase in pressure loss at the inlet side end face and outlet side end face of honeycomb structure. This occurs because, when a fluid (e.g. an exhaust gas) enters the cells, a fluid-stagnant portion appears at the cell inlet side end face; the substantial area of cell section through which the fluid can pass decreases sharply, and flow rate changes in this portion causing a fluid loss. Also at the cell outlet side end face, the area of cell section through which the fluid such as exhaust gas can pass increases sharply and flow rate changes causing a fluid loss. Also in the diesel particulate filter (DPF) used for purification of exhaust gas emitted from diesel engine or the like, there is a problem of the high pressure loss caused by the exhaust gas incoming resistance at the inlet side end face of honeycomb structure and the exhaust gas outgoing resistance at the outlet side end face.

In the diesel particulate filter, there is also the following problem. That is, the captured particulate matter deposits gradually in the filter with its use; the particulate matter adheres to the plugged ends of cells at the inlet side end face of filter; this invites further gradual deposition of particulate matter which leads to plugging of open cell ends at the inlet side end face of filter; as a result, a sharp increase in pressure loss takes place. One reason for this is considered to be that, since, as shown in FIG. 29(a) and FIG. 29(b), there is stagnation of exhaust gas flow at the inlet side end face 64 of each cell 63, particulate matter deposits easily at the inlet side end face 64 of each cell 63. Incidentally, numeral 66 indicates a plugging member which plugs an open end of a given cell 63.

When, as shown in FIG. 30(a) and FIG. 30(b), the outer surface of ceramic-based honeycomb structure 61 is covered with a heat-resistant holding member 68 showing an elasticity when compressed and the resulting honeycomb structure is housed in a container 67 (e.g. a metal-made container) while applying a compression pressure to the honeycomb structure via the holding member 68, to use it as a converter 60, the honeycomb structure 61 has been held in the container 67 by providing a retainer ring 69 at the peripheral area of end face of honeycomb structure 61 via a heat-resistant cushioning member, in order to prevent the occurrence of positional shift of honeycomb structure caused by the pressure of exhaust gas or by the vibration of engine. Ordinarily, a peripheral area of each end face of honeycomb structure 61, having a width of about 5 mm is held by the retainer ring 69. As a result, the open ends of the cells 63a at each peripheral area are blocked by the retainer ring 69, making the passage of exhaust gas difficult, which has invited a decrease in the substantial total area of cell sections of honeycomb structure 61 and an increase in pressure loss. Also in the filter, there is a decrease in the filtration area of cells 63 having the open ends blocked and this has invited a further increase in pressure loss. Further, even when the retainer ring 69 is provided only at the outlet side end face of honeycomb structure 61, the passage of fluid (e.g. exhaust gas) is difficult and an increase in pressure loss is invited when the open ends of cells 63*a* at the outlet side end face are blocked.

Also, when such a converter 60 is under actual load, there has been a problem that circumferential cracks tend to appear at the peripheral portion of honeycomb structure 61. The position of appearance of circumferential cracks is the middle portion of honeycomb structure 61 in its axial direction or the vicinity of the end of holding member 68. As the axial direction length of honeycomb structure 61 is larger, the circumferential cracks appear more at the middle portion in the axial direction. In a honeycomb structure 61 (honeycomb filter) in which the open ends of given cells 63 are plugged, the circumferential cracks appear more at the vicinity of the end of holding member 68.

When, as described above, the peripheral area of the end face of honeycomb structure 61 is blocked by the retainer ring 69, an exhaust gas is difficult to flow through the cells 63*a* of the peripheral portion of honeycomb structure 61 as shown in FIG. 31; the portion Y (which is an outer portion of honeycomb structure 61) has relatively low temperatures and the portion X (which is an inner portion constituted by cells 63*b* not blocked by the retainer ring 69) has relatively high temperatures; accordingly, a temperature difference is generated. Therefore, it is considered that, even when the inner portion X is heated and gives rise to thermal expansion in the axial direction, the outer portion has low temperatures and is unable to follow the inner portion; there appears a tensile stress of axial direction at the outer surface of honeycomb structure 61 and circumferential cracks are generated. Since a pressure is applied to the outer surface by the holding member 68 and the free thermal expansion of the outer surface is restricted, the tensile stress at the outer surface is larger as the pressure by the holding member 68 is larger. This is also true even when part of the cell open ends of honeycomb structure 61 is plugged for use as a filter.

As shown in FIG. 32, when a plugging member 66 is provided at part of the cell 63 open ends of honeycomb structure 61 to use it as a filter, there is discontinuous rigidity at the boundary portion Z, on the cell 63 inner side end face of plugging member 66, between the plugging member 66 and the adjacent open cell 63 not provided with the plugging member 66. Therefore, it is considered that, when the honeycomb structure 61 receives a pressure at the outer surface by the holding member 68 (see FIG. 31) or the like, stress concentration is generated at the outer surface of honeycomb structure 61 in the vicinity of the cell 63 inner side end face of plugging member 66, which generates circumferential cracks. Since a larger pressure may be applied to the end of holding member 68 (see FIG. 31) than to the inner portion of holding member 68 owing to an edge stress action, stress concentration is higher at the outer surface of honeycomb structure 61 in the vicinity of the cell 63 inner side end face of plugging member 66.

Further, when the honeycomb structure is used as a filter for exhaust gas, there has been a problem that cracks are generated at the vicinity of the exhaust gas inlet side end face of honeycomb structure owing to the thermal shock caused by the sharp temperature change of exhaust gas. Cracks are generated in a large amount particularly when the honeycomb structure is mounted in the vicinity of engine where the exhaust gas temperature is relatively high and the temperature change or flow rate change of exhaust gas is very sharp.

Although not shown by drawing, conventional honeycomb structures also have a problem that, when the solid foreign matter such as iron oxide peeled from an exhaust pipe is carried by an exhaust gas and arrives at the honeycomb structure, the inlet side end face of honeycomb structure tends to cause erosion. It has been confirmed that this erosion takes place easily particularly when the honeycomb structure is mounted near an engine and also when the honeycomb structure has thin partition walls or is made of a material of high porosity or large pore diameter.

Also, in a honeycomb structure such as shown in the Patent Literature 3, wherein cell section size is gradually changed over the entire length of honeycomb structure from the inlet side end face to the outlet side end face, there are a problem that cracks appear easily in firing of formed body for production of honeycomb structure and also a problem that it is unable to employ the conventional canning technique using a holding member 68, such as shown in FIG. 30(*a*) and FIG. 30(*b*).

The present invention has been made in view of the above-mentioned situation of prior art. The present invention provides a honeycomb structure which can show a low pressure loss as compared with conventional honeycomb structures and which, when used as a filter, can avoid the sharp increase in pressure loss, taking place at the inlet side end face owing to the plugging of cell open ends by particulate matter, can avoid the generation of circumferential cracks, and can avoid the thermal shock and erosion at the end face of honeycomb structure; and a method for manufacturing such a honeycomb structure.

DISCLOSURE OF THE INVENTION

The present invention provides the following honeycomb structure and the following method for manufacturing of honeycomb structure.

[1] A tubular honeycomb structure comprising partition walls which define and form a plurality of cells each functioning as a fluid passage extending from one end face of honeycomb structure to the other end face, wherein areas of the sections of the individual cells (cell sections) normal to the flow direction of fluid are made so as to be approximately equal to each other over a given range of the center of each cell and its vicinity in the fluid flow direction and to gradually decrease or gradually increase at each cell end of at least one end face of honeycomb structure in the fluid flow direction (Hereinafter sometimes referred to as "the first invention").

[2] A honeycomb structure according to [1], further comprising a plugging member which plugs the open ends of given cells at one end face of honeycomb structure and the open ends of residual cells at other end face.

[3] A honeycomb structure according to [1] or [2], further comprising an outer wall which covers the peripheral portion of the partition walls defining and forming the plurality of cells.

[4] A honeycomb structure according to any of [1] to [3], wherein the areas of the sections of individual cells are made so as to gradually decrease or gradually increase at each cell end at the two end faces of honeycomb structure in the fluid flow direction.

[5] A honeycomb structure according to any of [1] to [4], wherein the areas of the sections of all cells are made so as to gradually increase or gradually decrease at least at one end face of honeycomb structure.

[6] A honeycomb structure according to any of [1] to [5], wherein an outer diameter of honeycomb structure at least at its one end face is made so as to gradually decrease or gradually increase by more than ±0.5% of the outer diameter of honeycomb structure at its center and its vicinity.

[7] A honeycomb structure according to any of [1] to [6], wherein the areas of the cell sections are made so as to gradually decrease or gradually increase at the end of honeycomb structure having a length which is 25% or less of the axial direction length of honeycomb structure.

[8] A method for manufacturing a honeycomb structure, which comprises forming a clay containing a forming material, into a honeycomb shape to obtain a tubular honeycomb formed body comprising a plurality of cells each functioning as a fluid passage extending from one end face of honeycomb formed body to the other end face, and firing the honeycomb formed body to obtain a honeycomb structure, wherein there is placed, on at least one end face of the honeycomb formed body, a setter made of a material having a contraction coefficient of firing different from that of the honeycomb formed body and, in this state, the honeycomb formed body is fired to give rise to deformation in such a way that the areas of the sections of the individual cells (cell sections), normal to the flow direction of fluid decrease gradually or increase gradually at each cell end at the setter-placed end face of honeycomb formed body, to obtain a honeycomb structure wherein the areas of the sections of the individual cells are made so as to be approximately equal to each other over a given range of the center of each cell and its vicinity in the fluid flow direction and to decrease gradually or increase gradually at each cell end of at least one end face of honeycomb structure, in the fluid flow direction (Hereinafter sometimes referred to as "the second invention").

[9] A method for manufacturing a honeycomb structure according to [8], wherein there is placed, on both end faces of the honeycomb formed body, a setter made of a material having a contraction coefficient of firing different from that of the honeycomb formed body and, in this state, the honeycomb formed body is fired.

[10] A method for manufacturing a honeycomb structure, which comprises forming a clay containing a forming material, into a honeycomb shape to obtain a tubular honeycomb formed body comprising a plurality of cells each functioning as a fluid passage extending from one end face of honeycomb formed body to the other end face, and firing the honeycomb formed body to obtain a honeycomb structure, wherein there is placed, in the open ends of given cells at one end face of honeycomb formed body, a plugging member having a contraction coefficient of firing different from that of honeycomb formed body and, in this state, the honeycomb formed body is fired to give rise to deformation in such a way that the areas of the sections of the individual cells (cell sections), normal to the flow direction of fluid decrease gradually or increase gradually at each cell end at the plugging member-placed end face of honeycomb formed body, to obtain a honeycomb structure wherein the areas of the sections of the individual cells are made so as to be approximately equal to each other over a given range of the center of each cell and its vicinity in the fluid flow direction and to decrease gradually or increase gradually at each cell end of at least one end face of honeycomb structure in the fluid flow direction (Hereinafter sometimes referred to as "the third invention".)

[11] A method for manufacturing a honeycomb structure according to [10], wherein there is placed, also in the open ends of residual cells other than the given cells at the other end face of the honeycomb formed body, a plugging member having a contraction coefficient of firing different from that of honeycomb formed body and, in this state, the honeycomb formed body is fired.

The honeycomb structure of the present invention can show a lower pressure loss and, when used as a honeycomb filter, can avoid the sharp increase in pressure loss which appears at the end face of honeycomb structure at which a to-be-treated fluid enters owing to the plugging of cell open ends by particulate matter. Further, the present honeycomb structure can avoid circumferential cracks and even thermal shock and erosion at the end face of honeycomb structure. The method for manufacturing of honeycomb structure of the present invention can easily produce the above-mentioned honeycomb structure of the present invention.

BRIEF DESCRIPTION OF THE DRAWINGS

FIG. 23($b$) is a partially sectional view schematically showing a step for forming the outer wall of the honeycomb structure of the present invention (the first invention).

FIG. 26($b$) is a partially sectional view explaining one embodiment of the process for production of honeycomb structure, of the present invention (the second invention).

FIG. 27($b$) is a partially sectional view explaining another embodiment of the process for production of honeycomb structure, of the present invention (the second invention).

FIG. 28($b$) is a partially sectional view explaining one embodiment of the process for production of honeycomb structure, of the present invention (the second invention).

FIG. 29($b$) is a sectional view explaining a fluid flow in a conventional honeycomb structure.

FIG. 30($b$) is a partially sectional view showing a state in which a conventional honeycomb structure is housed in a container.

EXPLANATION OF NUMERALS

1 is a honeycomb structure; 2 is a partition wall; 3 is a cell; 4 is an end face (one end face); 5 is an end face (the other end face); 6 is a plugging member; 17 is a container; 8 is a holding member; 9 is an outer wall; 11 is a honeycomb structure; 12 is a partition wall; 13 is a cell; 14 is an end face (one end face); 15 is an end face (the other end face); 16 is a plugging member; 18 is a holding member; 21 is a honeycomb structure; 31 is a honeycomb structure; 32 is a honeycomb structure precursor; 33 is a grinding wheel; 34 is a coating material; 41 is a honeycomb structure; 42 is a partition wall; 43 is a cell; 44 is an end face (one end face); 45 is an end face (the other end face); 47 is a setter (used for firing); 51 is a honeycomb structure; 52 is a partition wall; 53 is a cell; 54 is an end face (one end face); 55 is an end face (the other end face); 56 is a plugging member; 57 is a setter (used for firing); 60 is a converter; 61 is a honeycomb structure; 63 is a cell; 64 is an end face; 67 is a container; 69 is a holding member; and 69 is a retainer ring.

BEST MODE FOR CARRYING OUT THE INVENTION

The modes for carrying out the honeycomb structure and process for production thereof according to the present invention (the first to third inventions) are described in detail below with reference to the accompanying drawings. However, the present invention is not restricted thereto and various changes, modifications and improvements may be made thereto based on the knowledge possessed by those skilled in the art, as long as there is no deviation from the scope of the present invention.

Figure 1:
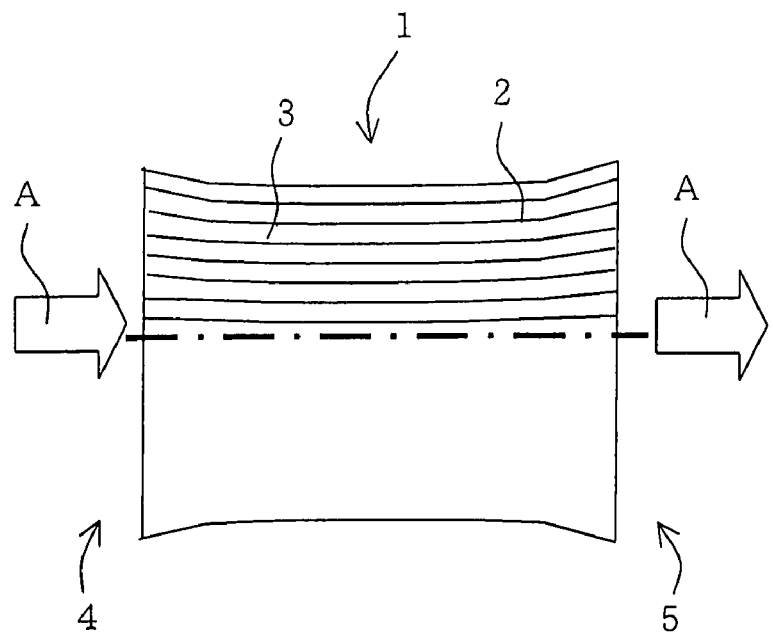
FIG. 1 is a partially sectional view schematically showing the constitution of one embodiment of the honeycomb structure of the present invention (the first invention).

FIG. 1 is a partially sectional view schematically showing the constitution of one embodiment of the honeycomb structure of the first invention. As shown in FIG. 1, the honeycomb structure 1 of the present embodiment is a tubular honeycomb structure 1 comprising partition walls 2 which define and form a plurality of cells 3 each functioning as a fluid passage extending from one end face 4 of honeycomb structure to the other end face 5, wherein the areas of the sections of the individual cells 3 (cell sections) normal to the flow direction A of fluid are made so as to be approximately equal to each other over a given range of the center of each cell and its vicinity in the fluid flow direction A and to increase gradually at each cell 3 end of at least one end face 4 of honeycomb structure in the fluid flow direction A. Incidentally, the honeycomb structure 1 of the present invention shown in FIG. 1 is constituted so that the area of each cell section increases gradually at the cell 3 ends of the two end faces 4 and 5 of honeycomb structure 1 in the fluid flow direction A and accordingly the shape of the peripheral portion of honeycomb structure 1 increases gradually as well at the cell 3 ends of the two end faces 4 and 5 of honeycomb structure 1 in the fluid flow direction A. Therefore, in the honeycomb structure 1 of the present embodiment, the cell density is different in the center of honeycomb structure and its vicinity and at around the two end faces 4 and 5 of honeycomb structure.

As mentioned above, in the honeycomb structure 1 of the present embodiment, the area of each cell section at the cell ends of two honeycomb structure end faces 4 and 5 increases gradually in the flow direction A of fluid; therefore, the honeycomb structure 1 can show a smaller incoming loss and a smaller outgoing loss of fluid such as exhaust gas and can show a lower pressure loss. Incidentally, in the honeycomb structure 1 shown in FIG. 1, the upper half indicates its section and the lower half indicates its appearance.

Figure 2:
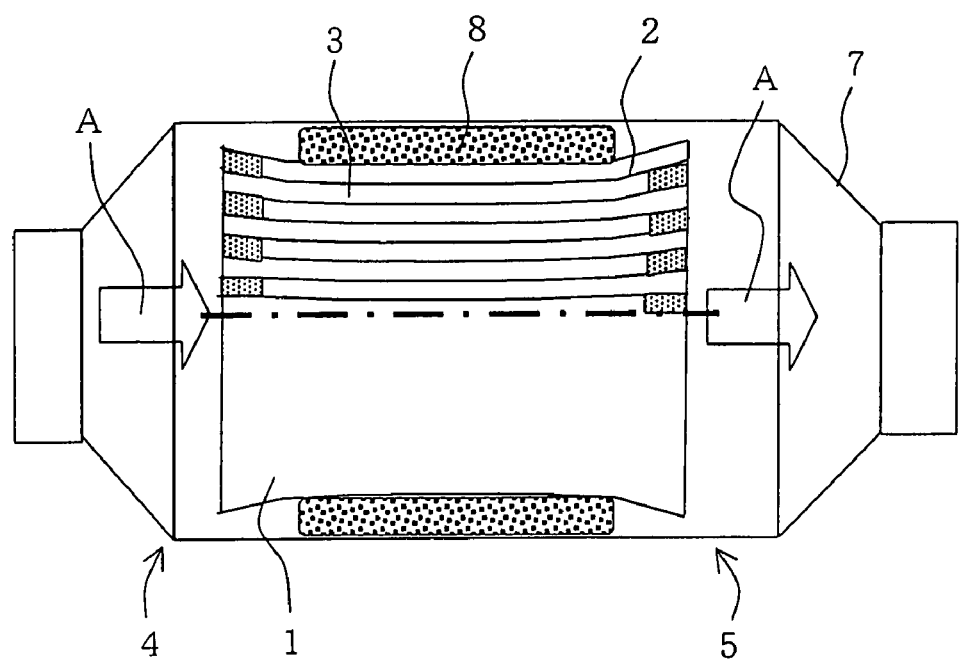
FIG. 2 is a partially sectional view showing a state in which one embodiment of the honeycomb structure of the present invention (the first invention) is housed in a container.

The honeycomb structure 1 of the present embodiment can be housed in a container 7 made of a metal or the like, using a conventional canning technique, as shown in FIG. 2. In conventional honeycomb structures, the area of each cell section has been about the same from end face of honeycomb structure to the other end face and the partition walls defining and forming each cell have been approximately parallel; accordingly, they have been housed in a container by being held at the outer surfaces by a holding member. In the honeycomb structure 1 of the present embodiment, the partition walls 2 defining and forming each cell 3 are approximately parallel in a given range of the center of each cell and its vicinity in the fluid flow direction A; however, they spread at a given angle at the cell ends of end faces 4 and 5.

Regarding conventional honeycomb structures, those with cells having an increased sectional area and cells having a decreased sectional area intermingled at one end face of honeycomb structure are disclosed in, for example, patent documents including JP-A-2004-321848, JP-A-2003-166410, and US 2003/0041575A1. The honeycomb structure 1 of the present embodiment is constituted so that the sectional areas of all cells increase gradually at each cell end of at least one end face 4.

As shown in FIG. 2, in accommodating the honeycomb structure 1 in a container, the portion of honeycomb structure 1 which is the center of honeycomb structure and its vicinity and whose outer diameter is approximately parallel is held by a holding member 8. By employing such a constitution, the end faces 4 and 5 having outer diameters larger than the outer diameter of the honeycomb center and its vicinity function as a stopper and there can be suppressed the positional shift of honeycomb structure 1, caused by the pressure of a fluid such as an exhaust gas entering the honeycomb structure 1. Also, since the outer diameter of honeycomb structure 1 is approximately parallel in the center and its vicinity, a uniform pressure can be applied to the honeycomb structure 1 by the holding member 8 and the accommodation of honeycomb structure 1 in container can be conducted satisfactorily according to the conventional canning technique.

Figure 30A:
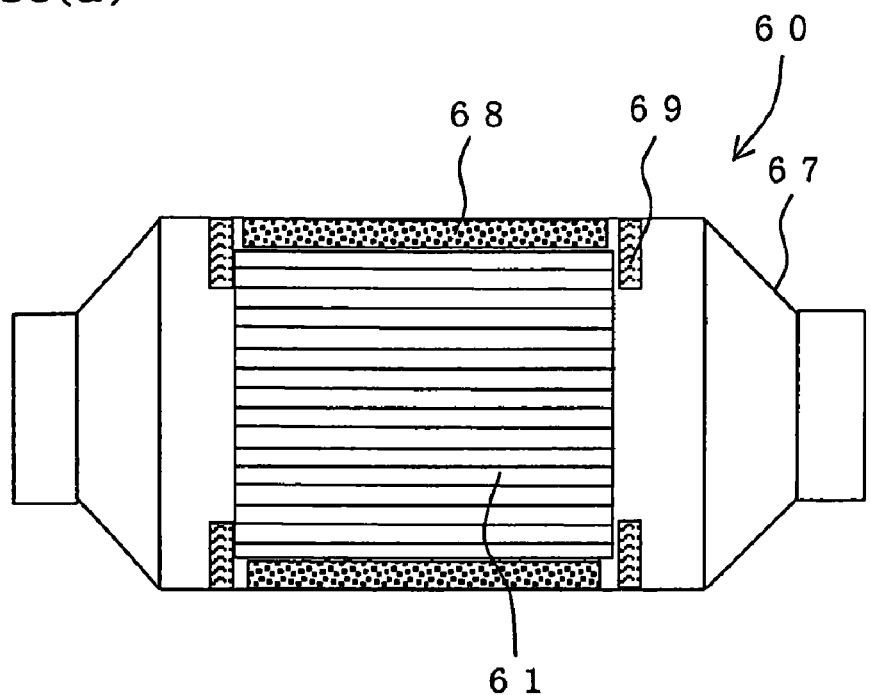
FIG. 30($a$) is a partially sectional view showing a state in which a conventional honeycomb structure is housed in a container.
Figure 30B:
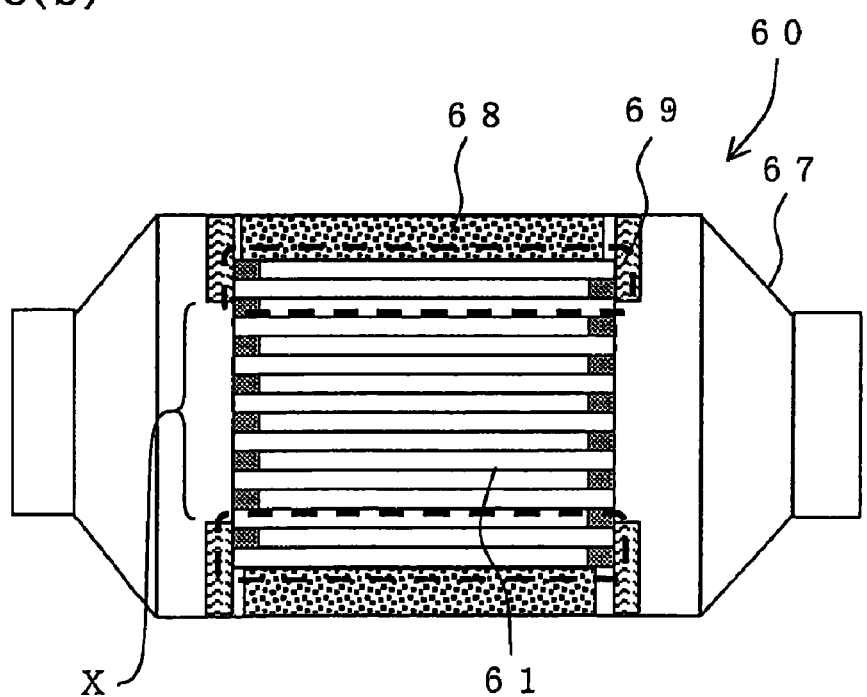
Figure 31:
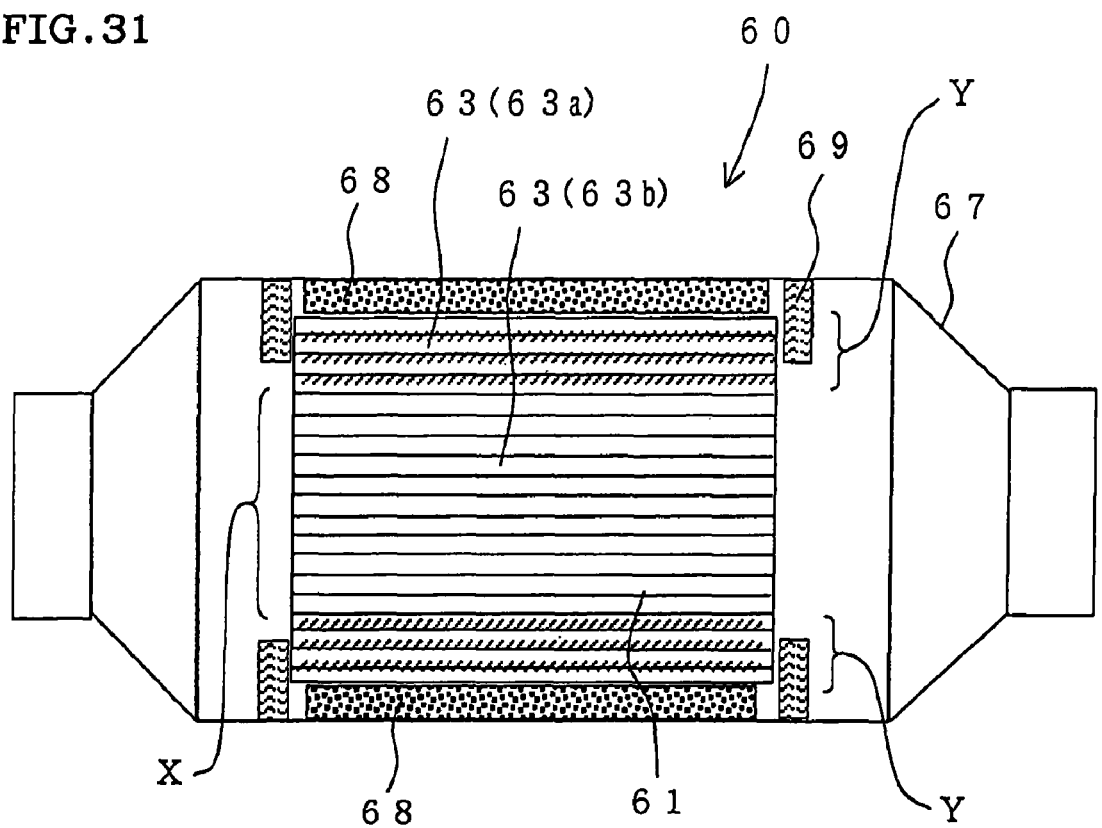
FIG. 31 is a partially sectional view showing a state in which a conventional honeycomb structure is housed in a container.
Figure 32:
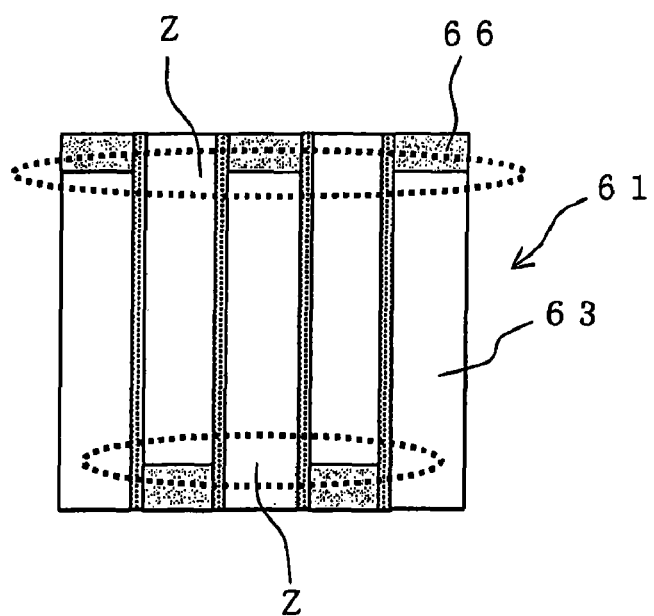
FIG. 32 is a partially sectional view of a conventional honeycomb structure.

Importantly, in the honeycomb structure 1 of the present embodiment, the positional shift of honeycomb structure 1 can be prevented using the holding member 8 alone without using a conventional retainer ring 69 (see FIG. 30); therefore, a fluid such as an exhaust gas can be allowed to pass through all the cells 3 of honeycomb structure 1. Therefore, the temperature difference between the peripheral portion of honeycomb structure 1 and the inner portion thereof can be made smaller and the honeycomb structure 1 can be effectively prevented from breakage such as circumferential cracks.

Figure 3:
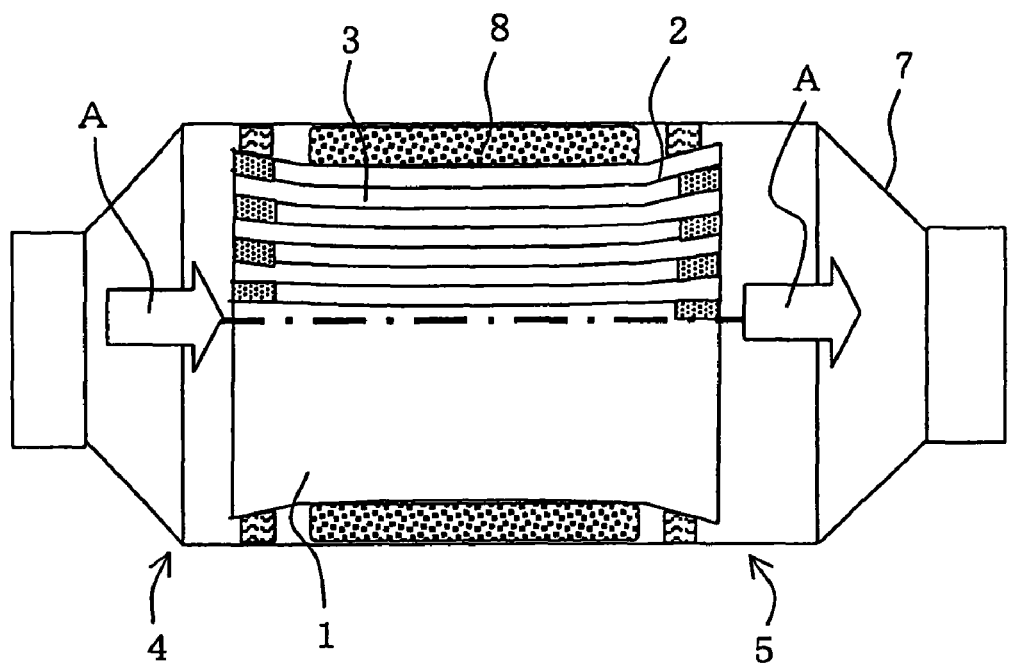
FIG. 3 is a partially sectional view showing a state in which one embodiment of the honeycomb structure of the present invention (the first invention) is housed in a container.

In housing the honeycomb structure 1 in a container to conduct canning, it is possible to provide, as shown in FIG. 3, other holding member 9 which holds the outer surface of honeycomb structure 1 at around the end face, in order to give an auxiliary holding power for honeycomb structure 1 in its axial direction.

Figure 4:
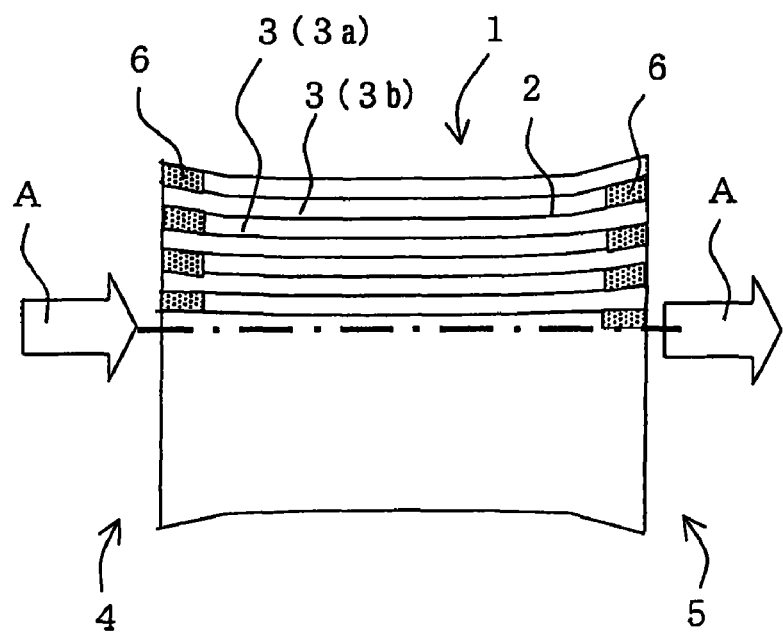
FIG. 4 is a partially sectional view schematically showing the constitution of another example of one embodiment of the honeycomb structure of the present invention (the first invention).

As shown in FIG. 4, in the honeycomb structure 1 of the present embodiment, a plugging member 6 may be provided at the ends of given cells 3a at one end face 4 of honeycomb structure 1 and at the ends of residual cells 3b at the other end face 5. In such a honeycomb structure 1, in accommodating it in a container by using a holding member 8 (see FIG. 2) or the like, substantially no pressure is applied to the outer surface of honeycomb structure 1 at around the inner end face of plugging member 6; as a result, the stress concentration at the outer surface can be relaxed effectively and the breakage such as circumferential cracks or the like can be prevented effectively.

Figure 5:
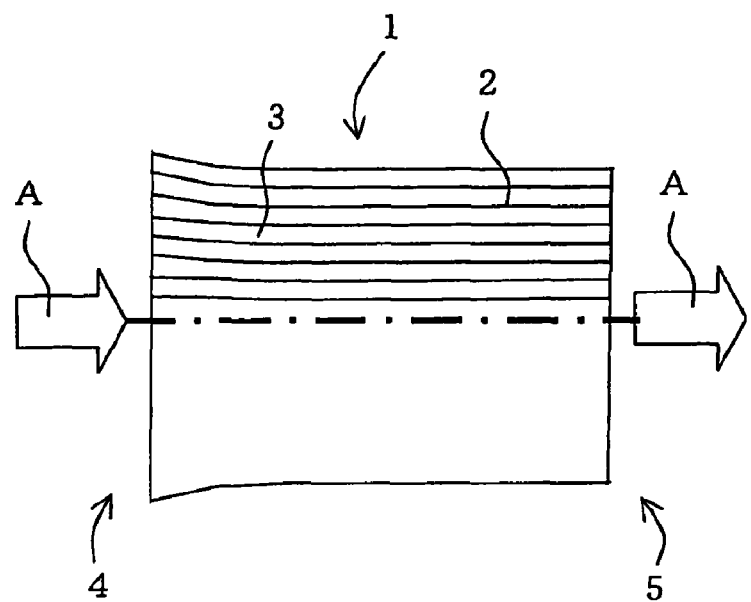
FIG. 5 is a partially sectional view schematically showing the constitution of another example of one embodiment of the honeycomb structure of the present invention (the first invention).
Figure 6:
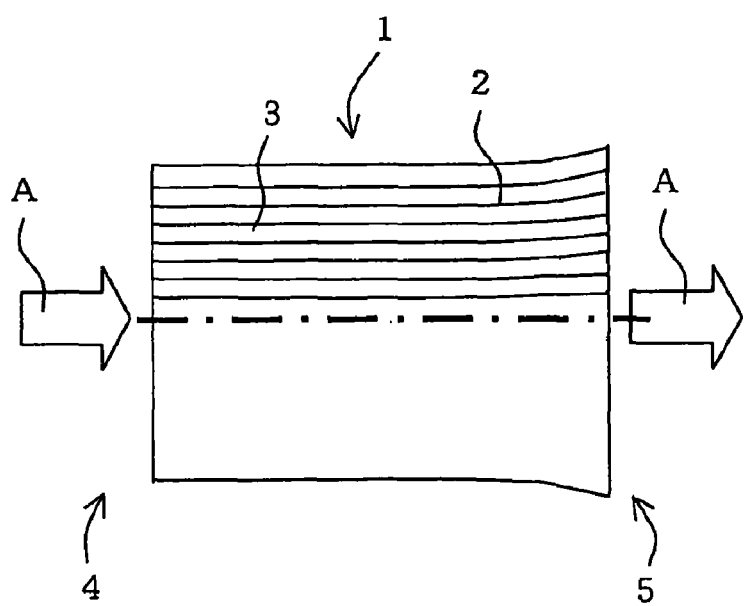
FIG. 6 is a partially sectional view schematically showing the constitution of another example of one embodiment of the honeycomb structure of the present invention (the first invention).

In the honeycomb structure 1 of the present embodiment shown in FIG. 1, the area of each cell section increases gradually at the cell 3 ends of the two end faces 4 and 5 of honeycomb structure 1 in the flow direction A of fluid. However, as shown in FIG. 5 and FIG. 6, there may be employed a constitution wherein the area of each cell section increases gradually at the cell 3 ends of one end face 4 or 5 in the flow direction A. FIG. 5 indicates a honeycomb structure 1 wherein the area of each cell section increases gradually at the cell ends of the end face 4 of fluid inlet side, and FIG. 6 indicates a honeycomb structure 1 wherein the area of each cell section increases gradually at the cell ends of the end face 5 of fluid outlet side. In the honeycomb structures 1 shown in FIG. 5 and FIG. 6, a plugging member 6 may be provided at the ends of given cells 3a at one end face 4 and the ends of residual cells 3b at the other end face 5.

There is no particular restriction as to the position at which the area of cell section begins to increase gradually, and there is no particular restriction, either, as to the pattern in which the area of cell section changes. For example, although not shown by drawing, the gradual increase may be linear or may be one having a desired curvature, at around the end face. There is a case in which the area of cell section changes slightly near the honeycomb center and its vicinity where the areas of cell sections are approximately equal to each other and changes with a very mild curvature in the honeycomb center and its vicinity; however, this change in the honeycomb center and its vicinity is a small dimensional change within the allowance of the dimension of honeycomb structure and the areas of cell sections in the honeycomb center and its vicinity can be regarded to be substantially about the same. From the standpoint of canning, the allowance of the average outer diameter of honeycomb structure can be set, for example, at about ±0.5%, although this need not be restricted to a specific value. In the honeycomb structure 1 of the present embodiment, since the area of cell section increases gradually at least at either of the end faces 4 and 5, the outer diameter of that end face 4 or 5 is larger than the allowable limit of the outside diameter of honeycomb structure. In the center of honeycomb structure 1 and its vicinity, the outer diameter is in a small dimensional change within the allowance of outer diameter. That is, when the outer diameter of honeycomb structure 1 is 90 mm and its allowance is +0.5%, the outer diameter of honeycomb structure 1 changes between 89.55 mm and 90.45 mm in the center and its vicinity and, at least at one end face 4 or 5, the outer diameter increases gradually to be outside the above range.

It is possible that the honeycomb structure 1 of the present embodiment, shown in FIG. 1, is constituted in such a shape that the areas of cell sections at the two end faces 4 and 5 increase sharply, which is similar to "Tsutsumi", a Japanese classical instrument. However, when there is such a sharp increase, cracking tends to happen during the firing of honeycomb fired body, or it is impossible to secure the center of honeycomb structure and its vicinity where the areas of cell sections are about equal to each other; therefore, the honeycomb structure 1 is preferred to be so constituted that the area of each cell section increases gradually in such an extent that no breakage or the like occurs.

Figure 7:
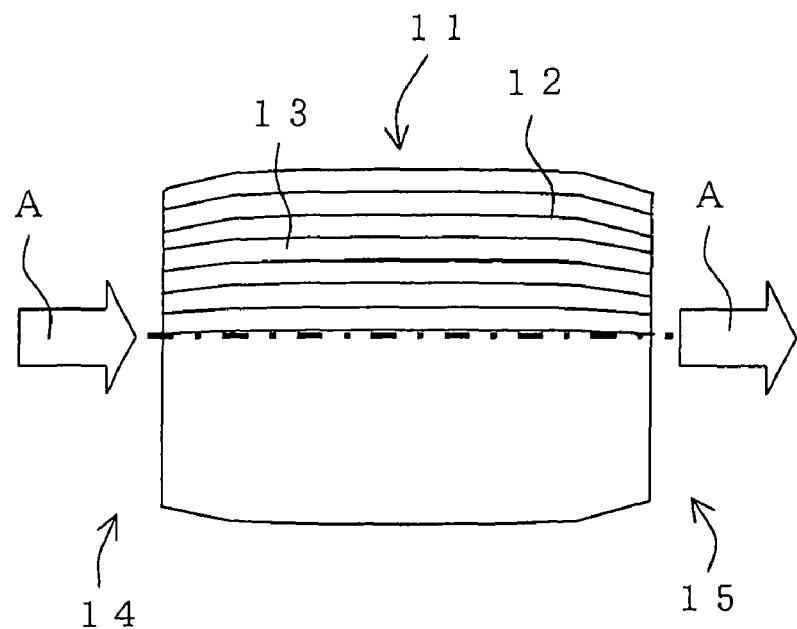
FIG. 7 is a partially sectional view schematically showing the constitution of another embodiment of the honeycomb structure of the present invention (the first invention).

Next, description is made on other embodiment of the honeycomb structure of the first invention. FIG. 7 is a partially sectional view schematically showing the constitution of other embodiment of the honeycomb structure of the present invention. As shown in FIG. 7, the honeycomb structure 11 of the present embodiment is a tubular honeycomb structure 11 comprising partition walls 12 which define and form a plurality of cells 13 each functioning as a fluid passage extending from one end face 14 of honeycomb structure to the other end face 15, wherein the areas of the sections of the individual cells 13 (cell sections) normal to the flow direction A of fluid are made so as to be approximately equal to each other over a given range of the center of each cell 13 and its vicinity in the fluid flow direction A and to gradually decrease at each cell 13 end of at least one end face 14 of honeycomb structure in the fluid flow direction A. Incidentally, the honeycomb structure 11 of the present invention shown in FIG. 7 is so constituted that the area of each cell section decreases gradually at the cell 13 ends of the two end faces 14 and 15 of honeycomb structure 11 in the fluid flow direction A and accordingly the shape of the peripheral portion of honeycomb structure 11 increases gradually as well at the cell 13 ends of the two ends faces 14 and 15 of honeycomb structure 11 in the fluid flow direction A. Therefore, in the honeycomb structure 1 of the present embodiment, the cell density is different in the center of honeycomb structure and its vicinity and at around the two end faces 14 and 15 of honeycomb structure. Incidentally, in the honeycomb structure 11 shown in FIG. 7, the upper half indicates a section of honeycomb structure and the lower half indicates an appearance thereof.

Figure 8:
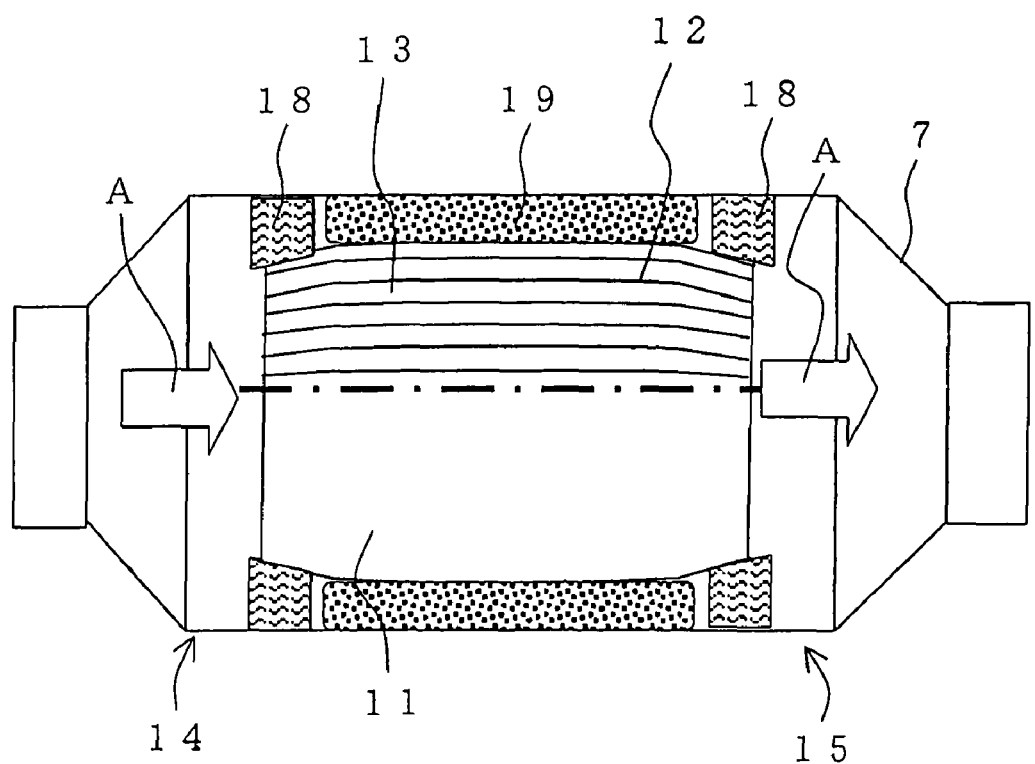
FIG. 8 is a partially sectional view showing a state in which another embodiment of the honeycomb structure of the present invention (the first invention) is housed in a container.

When the honeycomb structure 11 of the present embodiment is subjected to canning, that is, housing in container 7 made of metal or the like, as shown in FIG. 8, the honeycomb structure 11 can be fixed in the container 7 without using a conventional retainer ring 69 (see FIG. 30), by providing, at the tapered portions of the outer surface of honeycomb structure, adjacent to the end faces of 14 and 15 of honeycomb structure, a holding member 18 having a shape corresponding to each tapered outer surface portion. By employing such a constitution, the positional shift of honeycomb structure 11 can be prevented by the use of the holding member 18 alone, without using the conventional retainer ring 69 (see FIG. 30) and a fluid (e.g. an exhaust gas) can be allowed to pass through all the cells 13 of honeycomb structure 11. Therefore, the temperature difference between the peripheral portion of honeycomb structure 11 and the inner portion thereof can be made smaller and the honeycomb structure 11 can be effectively prevented from breakage such as circumferential cracks. In conducting canning as above, the holding member 18 may be allowed to cover part of each end face 14 and 15 in order to increase the holding power for honeycomb structure 11 in the axial direction.

In conventional honeycomb structures, for example, those disclosed in patent documents such as JP-A-2004-321848, JP-A-2003-166410, and US 2003/0041575A1, there are, at one end face of honeycomb structure, cells having an increased sectional area and cells having a decreased sectional area intermingled. The honeycomb structure 11 of the present embodiment is so constituted that the sectional areas of all cells decrease gradually at each cell end of at least one end face 14.

since the outer diameter of honeycomb structure 11 is approximately the same in the center and its vicinity, a uniform pressure can be applied to the portion by providing other holding member 19 at the portion, and the canning (accommodation of honeycomb structure in container) can be conducted satisfactorily with the use of the conventional canning technique.

Figure 9:
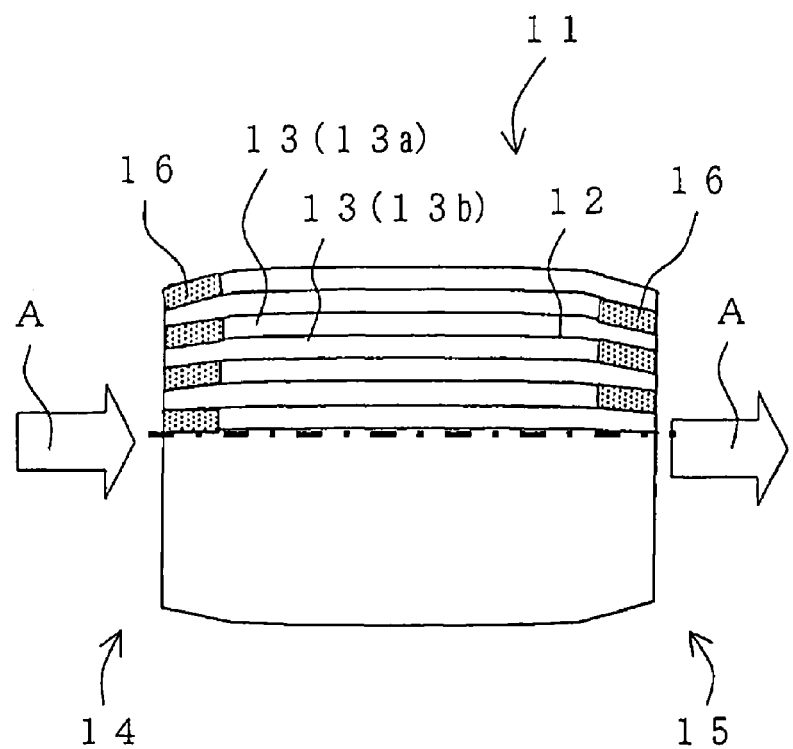
FIG. 9 is a partially sectional view schematically showing the constitution of another example of another embodiment of the honeycomb structure of the present invention (the first invention).

As shown in FIG. 9, in the honeycomb structure 11 of the present embodiment, a plugging member 16 may be provided at the ends of given cells 13a at one end face 14 of honeycomb structure 11 and at the ends of residual cells 13b at other end face 15. In such a honeycomb structure 11, in accommodating it in a container by using a holding member 18 (see FIG. 8) or the like, substantially no pressure is applied to the outer surface of honeycomb structure 11 at around the inner end face of plugging member 16; as a result, stress concentration at the outer surface can be relaxed effectively and breakage such as circumferential cracks or the like can be prevented effectively.

Figure 10:
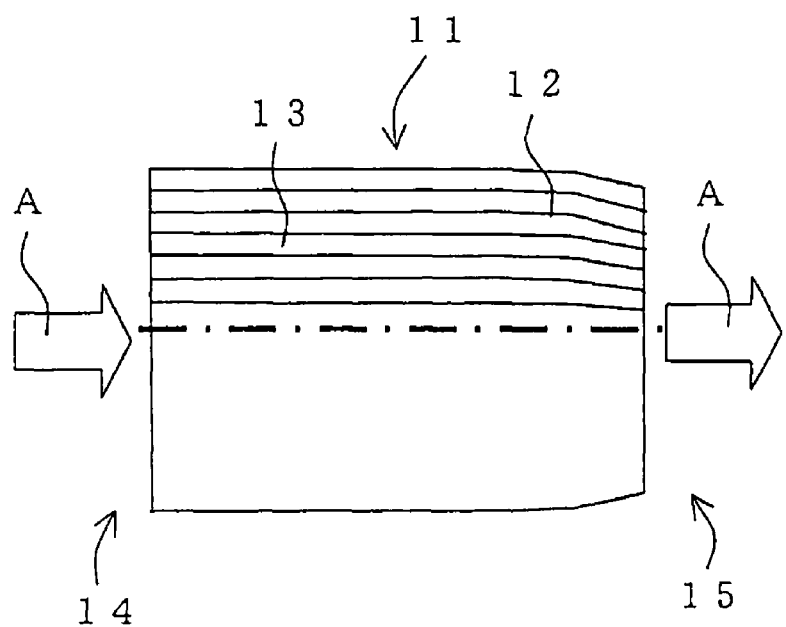
FIG. 10 is a partially sectional view schematically showing the constitution of another example of another embodiment of the honeycomb structure of the present invention (the first invention).
Figure 11:
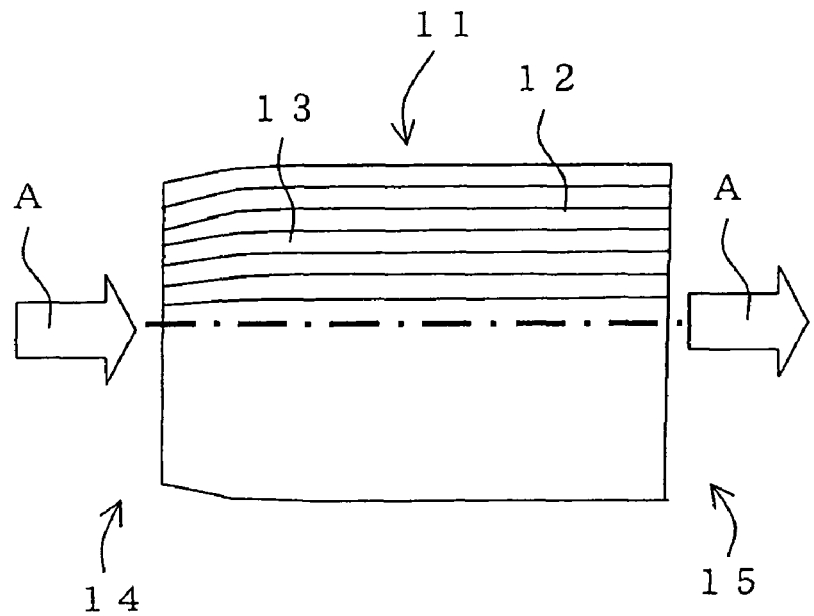
FIG. 11 is a partially sectional view schematically showing the constitution of another example of another embodiment of the honeycomb structure of the present invention (the first invention).

In the honeycomb structure 11 of the present embodiment shown in FIG. 7, the area of each cell section decreases gradually at the cell 13 ends of the two end faces 14 and 15 of honeycomb structure 1 in the flow direction A of fluid. However, as shown in FIG. 10 and FIG. 11, there may be employed a constitution wherein the area of each cell section decreases gradually at the cell 13 ends of one end face 14 or 15 in the flow direction A. FIG. 10 indicates a honeycomb structure 11 wherein the area of each cell section decreases gradually at the cell ends of the end face 14 of fluid inlet side, and FIG. 11 indicates a honeycomb structure 1 wherein the area of each cell section decreases gradually at the cell ends of the end face 15 of fluid outlet side. In the honeycomb structure 11 shown in FIG. 10 and FIG. 11, a plugging member 16 may be provided at the ends of given cells 13a at one end face 14 and the ends of residual cells 13b at the other end face 15, as shown in FIG. 9.

When the honeycomb structure 11 is used, for example, as a filter and is regenerated by removing the particulate matter deposited on the partition walls 12, a larger stress appears at the honeycomb structure end of outlet end face 15 side. Therefore, the area of cell section may be decreased gradually at the honeycomb structure end of outlet end face 15 side, in order to increase the mechanical strength of that end.

In the honeycomb structure 11 shown in FIG. 11, the edge stress at the honeycomb structure end of inlet end face 14 side can be decreased. Ordinarily, the honeycomb structure end of inlet end face 14 side receives the temperature change of fluid such as exhaust gas directly; accordingly, at this end, the thermal shock is severe and a thermal stress is added to the edge stress at the end of holding member 18, easily causing breakage such as circumferential cracks. However, gradual decrease in the area of each cell section at the honeycomb structure end of inlet end face 14 side is effective for prevention of breakage such as circumferential cracks particularly when the honeycomb structure 11 has been placed close-coupled near an engine.

There is no particular restriction as to the position at which the area of cell section begins to decrease gradually, and there is no particular restriction, either, as to the pattern in which the area of cell section changes. For example, although not shown by drawing, the gradual decrease may be linear or may be one having a desired curvature, at around the end face of honeycomb structure. There is a case in which the area of cell section changes slightly near the honeycomb structure center and its vicinity where the areas of cell sections are approximately equal to each other and changes with a very mild curvature in the honeycomb center and its vicinity; however, this change in the honeycomb center and its vicinity is a small dimensional change within the allowance of the dimension of honeycomb structure and the areas of cell sections in the honeycomb center and its vicinity can be regarded to be substantially about the same. From the standpoint of canning, the allowance of the average outer diameter of honeycomb structure can be set, for example, at about ±0.5%, although this need not be restricted to a specific value. In the honeycomb structure 11 of the present embodiment, since the area of cell section increases gradually at least at either of the end faces 14 and 15, the outer diameter of that end face 14 or 15 is smaller than the allowable limit of the outer diameter of honeycomb structure. In the center of honeycomb structure 11 and its vicinity, the outer diameter is in a small dimensional change within the allowance of outer diameter. That is, when the outer diameter of honeycomb structure 1 is 90 mm and its allowance is ±0.5%, the outer diameter of honeycomb structure 1 changes between 89.55 mm and 90.45 mm in the center and its vicinity and, at least at one end face 14 or 15, the outer diameter is outside the above range and increases gradually. There is no particular restriction, either, as to the length of the honeycomb center and its vicinity where the area of cell section is about the same, and the length may be such that a substantially sufficient pressure can be applied over the length with the use of the conventional canning technique.

It is possible that the honeycomb structure 11 of the present embodiment, shown in FIG. 7, is constituted in such a shape that the areas of cell sections at the two end faces 14 and 15 decrease sharply, which is similar to Taiko, a Japanese classical instrument. However, when there is such a sharp decrease, cracking tends to happen during the firing of honeycomb fired body, or it is impossible to secure the center of honeycomb structure and its vicinity where the areas of cell sections are about equal to each other; therefore, the honeycomb structure 11 is preferred to be so constituted that the area of each cell section increases gradually in such an extent that no breakage or the like occurs.

Figure 12:
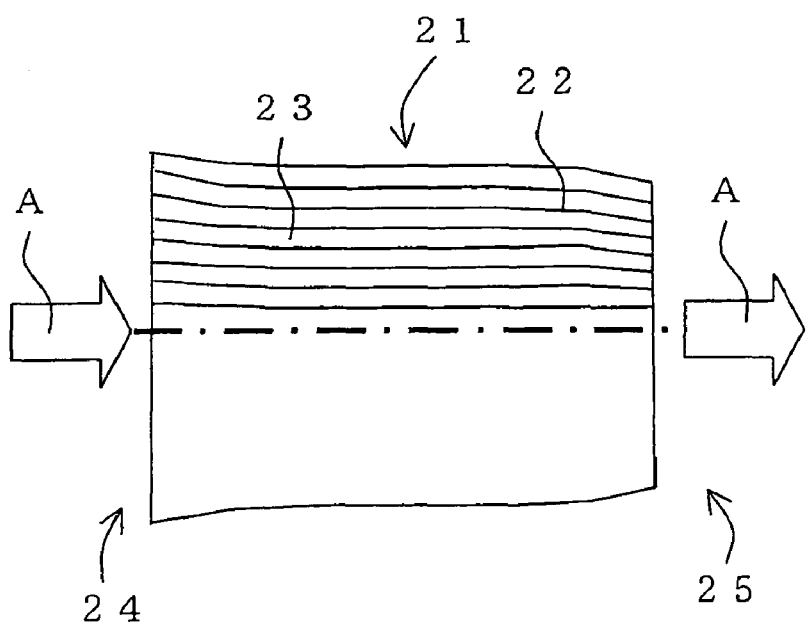
FIG. 12 is a partially sectional view schematically showing the constitution of one example of another embodiment of the honeycomb structure of the present invention (the first invention).
Figure 13:
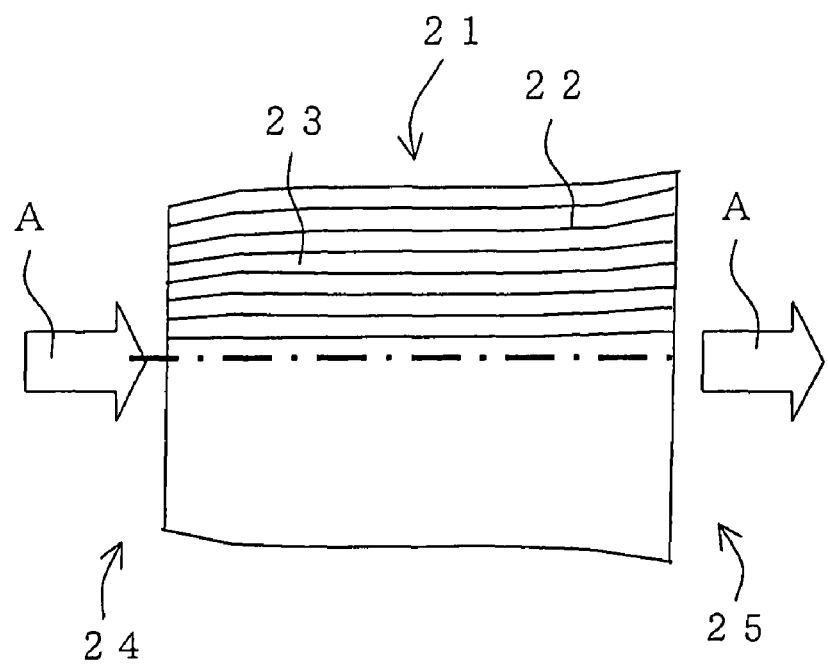
FIG. 13 is a partially sectional view schematically showing the constitution of another example of another embodiment of the honeycomb structure of the present invention (the first invention).

Next, description is made on still another embodiment of the honeycomb structure of the first invention. FIG. 12 and FIG. 13 are each a partially sectional view schematically showing the constitution of still other embodiment of the honeycomb structure of the present invention. As shown in FIG. 12 and FIG. 13, the honeycomb structure 21 of the present embodiment is a tubular honeycomb structure 21 comprising partition walls 22 which define and form a plurality of cells 23 each functioning as a fluid passage extending from one end face 24 of honeycomb structure to the other end face 25, wherein the areas of the sections of the individual cells 23 (cell sections) normal to the flow direction A of fluid are made so as to be approximately equal to each other over a given range of the center of each cell 23 and its vicinity in the fluid flow direction A and to gradually increase at each cell end of one end face of honeycomb structure (the end face 24 of inlet side in FIG. 12 and the end face 25 of outlet side in FIG. 13), in the fluid flow direction A and gradually decrease at each cell end of the other end face (the end face 25 of outlet side in FIG. 12 and the end face 24 of inlet side in FIG. 13) in the fluid flow direction A. In the honeycomb structure 21 of the present embodiment shown in FIG. 12 or FIG. 13, the change in the sectional area of cell 23 is accompanied by a change in the shape of peripheral portion of honeycomb structure 21. Incidentally, in the honeycomb structure 21 of the present embodiment shown in FIG. 12 or FIG. 13, the upper half of honeycomb structure 21 indicates a section of honeycomb structure and the lower half indicates an appearance thereof.

By employing the above constitution, there can be obtained the same effects as in the honeycomb structures shown in FIG. 1 and FIG. 7. Incidentally, the change in the form or the like of the section of cell 23 is preferred to be the same as in the above-described honeycomb structures of FIG. 1 to FIG. 11.

Next, description is made on still another embodiment of the honeycomb structure of the first invention. The honeycomb structure of the present embodiment is a honeycomb structure of outer surface-coated type, obtained by removing, in the honeycomb structure of any of the above-mentioned embodiments, its peripheral portion including the outer wall, coating other material on the portion, and drying or firing the resulting honeycomb structure to form an outer wall.

Figure 14:
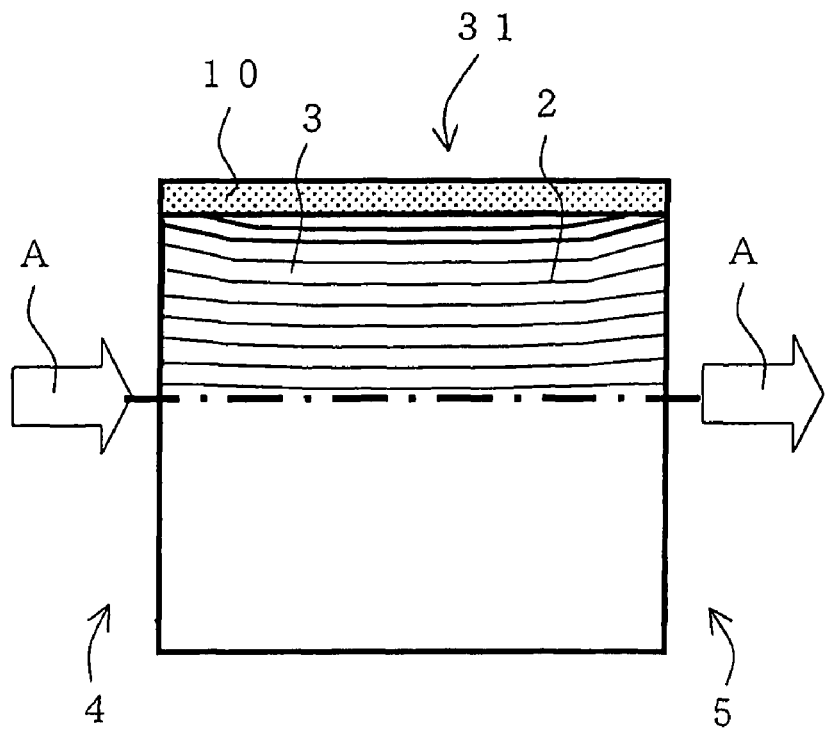
FIG. 14 is a partially sectional view schematically showing the constitution of one example of another embodiment of the honeycomb structure of the present invention (the first invention).
Figure 15:
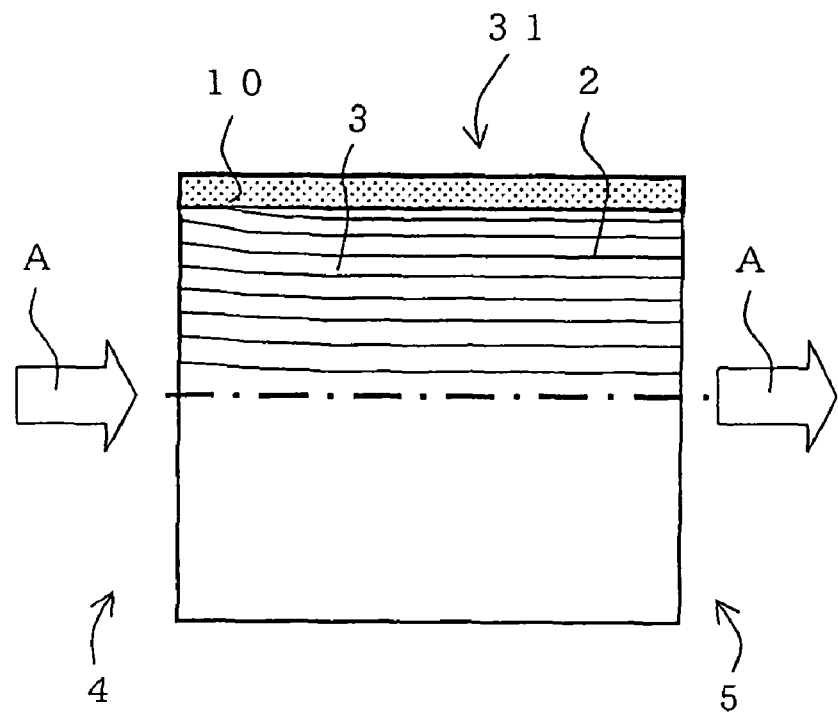
FIG. 15 is a partially sectional view schematically showing the constitution of another example of another embodiment of the honeycomb structure of the present invention (the first invention).
Figure 16:
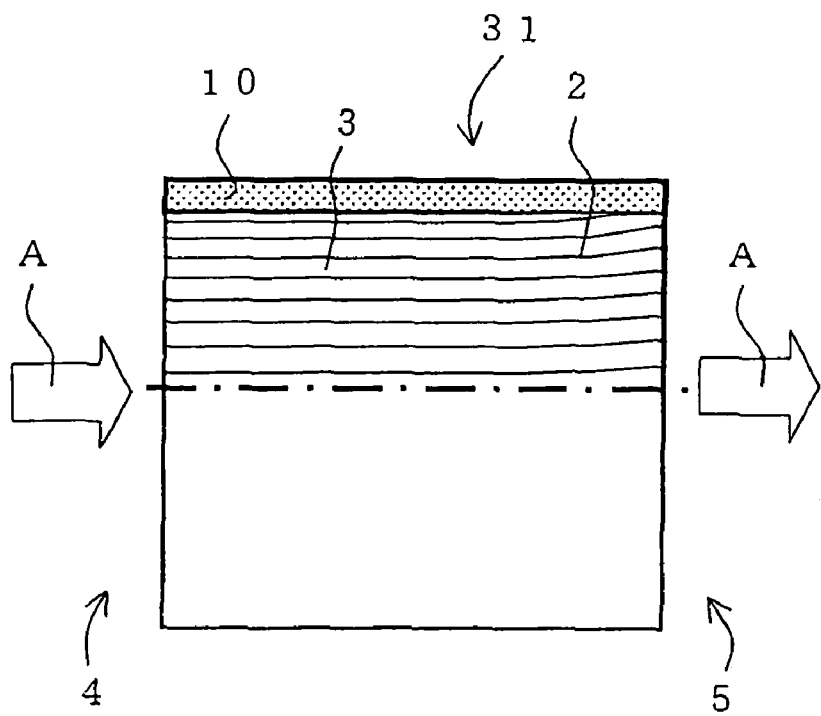
FIG. 16 is a partially sectional view schematically showing the constitution of another example of another embodiment of the honeycomb structure of the present invention (the first invention).

As the honeycomb structure of the present embodiment, there can be mentioned, for example, honeycomb structures 31 shown in FIGS. 14 to 16, having an outer wall 9 which covers the outer portion of the partition walls 2 defining and forming a plurality of cells 3 and which has been formed by processing the peripheral portion of any of the honeycomb structures 1 shown in FIG. 1, FIG. 5 and FIG. 6, into a cylindrical shape and then coating an outer wall material on the processed portion. In these honeycomb structures 31, since the shape of cell 3 is the same as that of the honeycomb structures 1 shown in FIG. 1, FIG. 5 and FIG. 6, the above-mentioned effects owing to the gradual increase in the area of cell section can be obtained while the features of the outer surface-coated type are utilized. Incidentally, in the honeycomb structures 31 shown in FIG. 14 to FIG. 16, the same elements as in the honeycomb structures 1 of FIG. 1, FIG. 5 and FIG. 6 are provided with the same numerals as in the latter honeycomb structures 1, and no explanation is made for each numeral.

Figure 17:
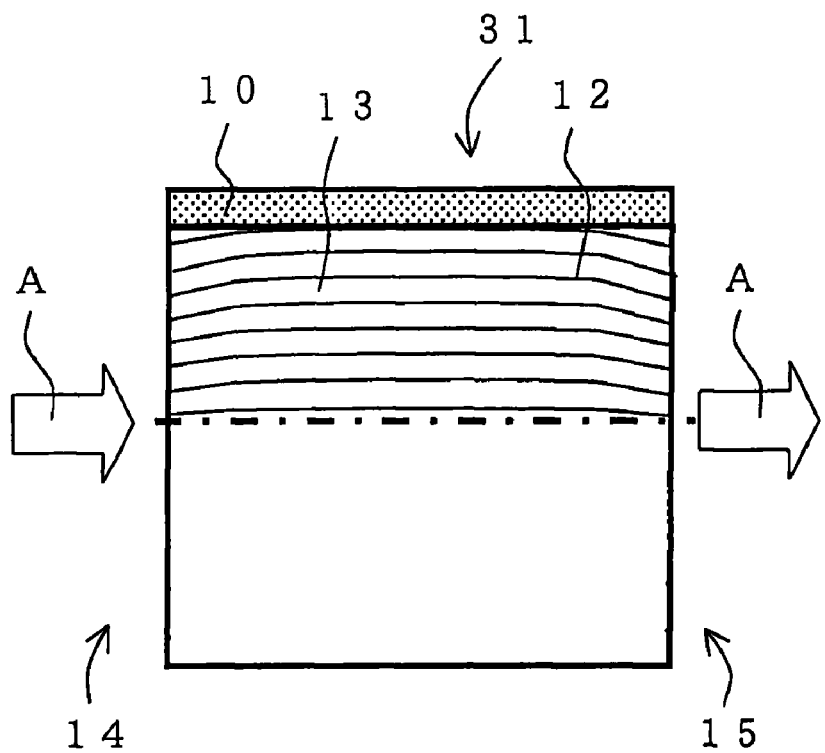
FIG. 17 is a partially sectional view schematically showing the constitution of one example of another embodiment of the honeycomb structure of the present invention (the first invention).
Figure 18:
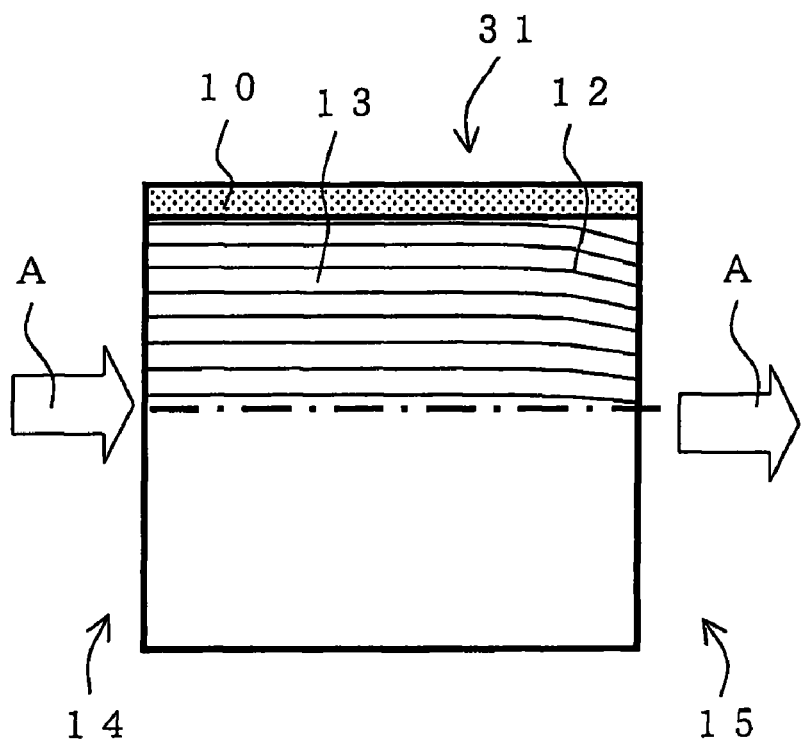
FIG. 18 is a partially sectional view schematically showing the constitution of another example of another embodiment of the honeycomb structure of the present invention (the first invention).
Figure 19:
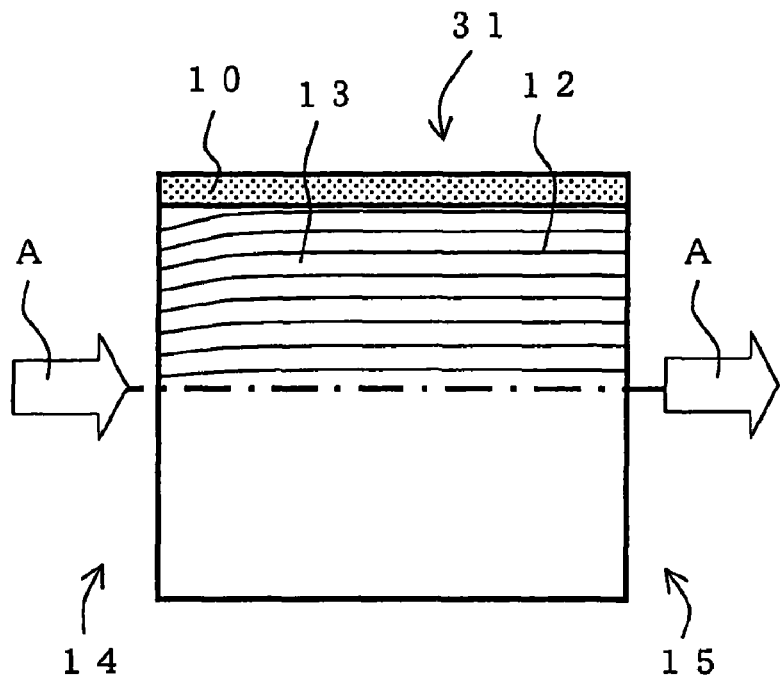
FIG. 19 is a partially sectional view schematically showing the constitution of another example of another embodiment of the honeycomb structure of the present invention (the first invention).
Figure 20:
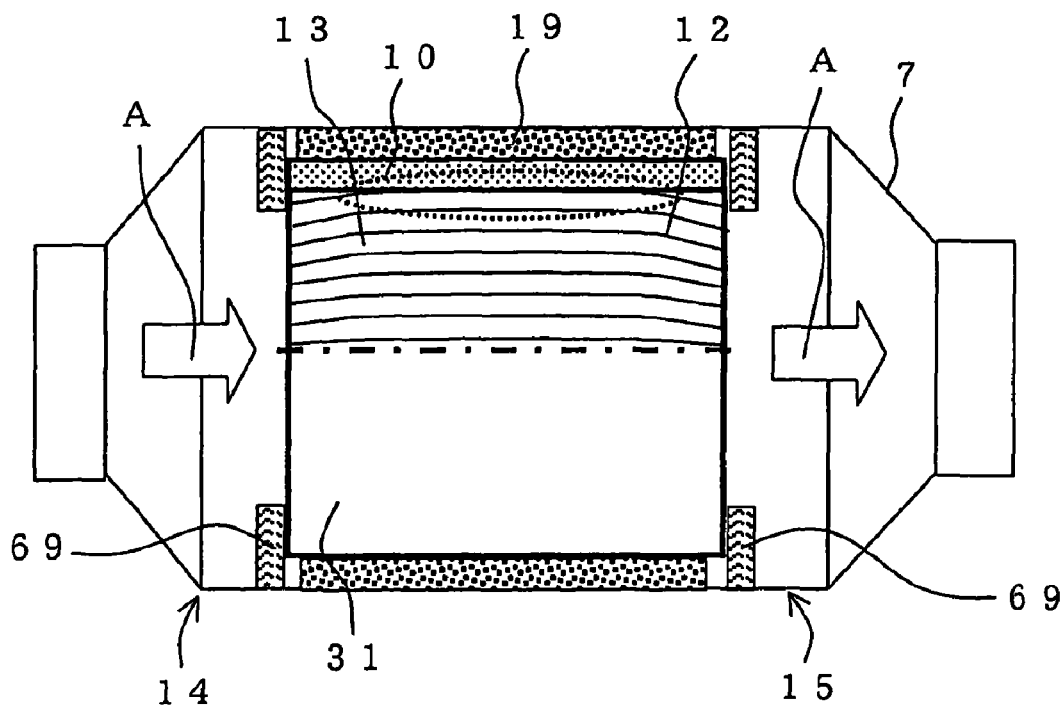
FIG. 20 is a partially sectional view showing a state in which another embodiment of the honeycomb structure of the present invention (the first invention) is housed in a container.

Also, the honeycomb structure of the present embodiment may be honeycomb structures 31 shown in FIGS. 17 to 19, having an outer wall 9 which covers the outer portion of the partition walls 12 defining and forming a plurality of cells 13 and which has been formed by processing the peripheral portion of any of the honeycomb structure 11 shown in FIGS. 7, 10 and 11, into a cylindrical shape and coating a outer wall material on the processed portion. In these honeycomb structures 31, even when housed in a container 7 made of a metal or the like by using a retainer ring 69 of conventional shape, as shown in FIG. 20, the cells 13 functioning as a fluid passage can be utilized effectively and the dead space in the center and its vicinity in the flow direction A of fluid can be decreased. As a result, the temperature difference between the peripheral portion of honeycomb structure 31 and its inner portion can be reduced and the breakage such as circumferential cracks or the like can be prevented effectively. Incidentally, in the honeycomb structures 31 shown in FIG. 17 to FIG. 19, the same elements as in the honeycomb structures 11 of FIG. 7, FIG. 10 and FIG. 11 are provided with the same numerals as in the latter honeycomb structures 11, and no explanation is made for each numeral.

Figure 21:
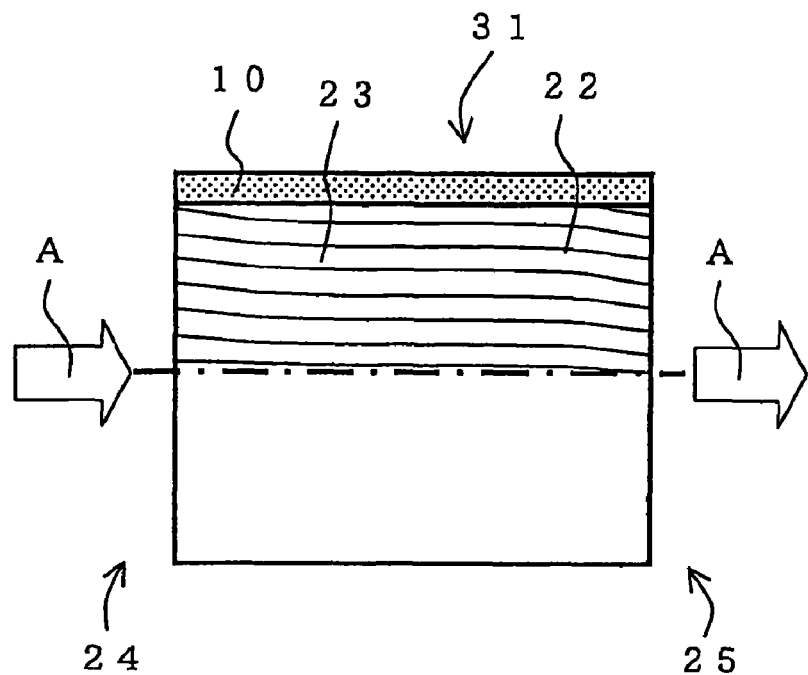
FIG. 21 is a partially sectional view schematically showing the constitution of one example of another embodiment of the honeycomb structure of the present invention (the first invention).
Figure 22:
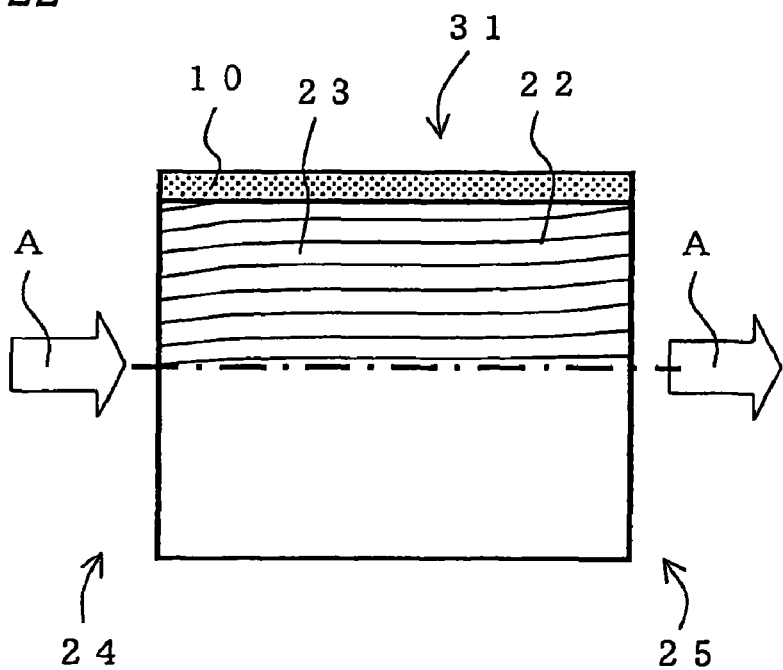
FIG. 22 is a partially sectional view schematically showing the constitution of another example of another embodiment of the honeycomb structure of the present invention (the first invention).

Also, the honeycomb structure of the present embodiment may be honeycomb structures 31 shown in FIGS. 21 and 22, having an outer wall 9 which covers the outer portion of the partition walls 22 defining and forming a plurality of cells 23 and which has been formed by processing the peripheral portion of any of the honeycomb structure 21 shown in FIGS. 12 and 13, into a cylindrical shape and coating a outer wall material on the processed portion. In these honeycomb structures 31, since the shape of cell 23 is the same as that of the honeycomb structures 21 shown in FIG. 12 and FIG. 13, the above-mentioned effects owing to the gradual increase or decrease in the area of cell section can be obtained while the features of the outer surface-coated type are utilized. Incidentally, in the honeycomb structures 31 shown in FIG. 21 and FIG. 22, the same elements as in the honeycomb structures 21 of FIG. 12 and FIG. 13 are provided with the same numerals as in the latter honeycomb structures 21, and no explanation is made for each numeral.

Figure 23A:
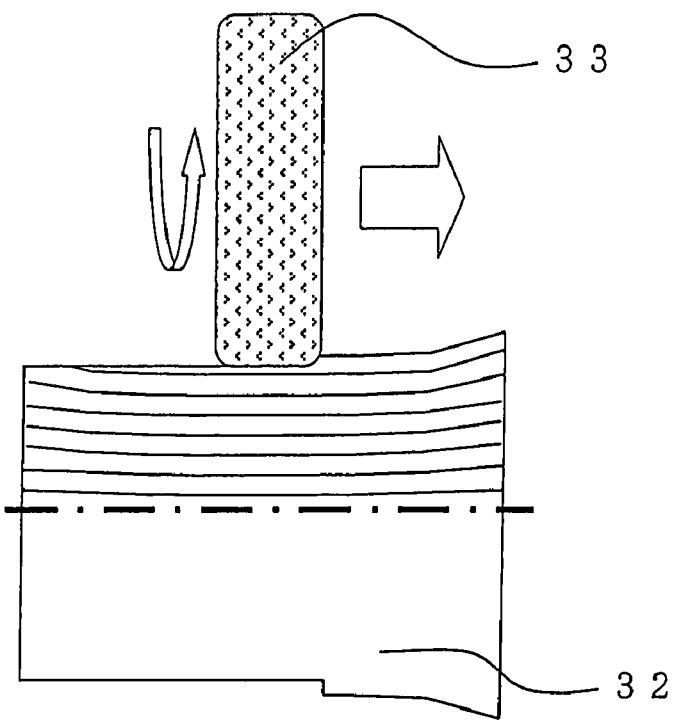
FIG. 23($a$) is a partially sectional view schematically showing a step for forming the outer wall of the honeycomb structure of the present invention (the first invention).
Figure 23B:
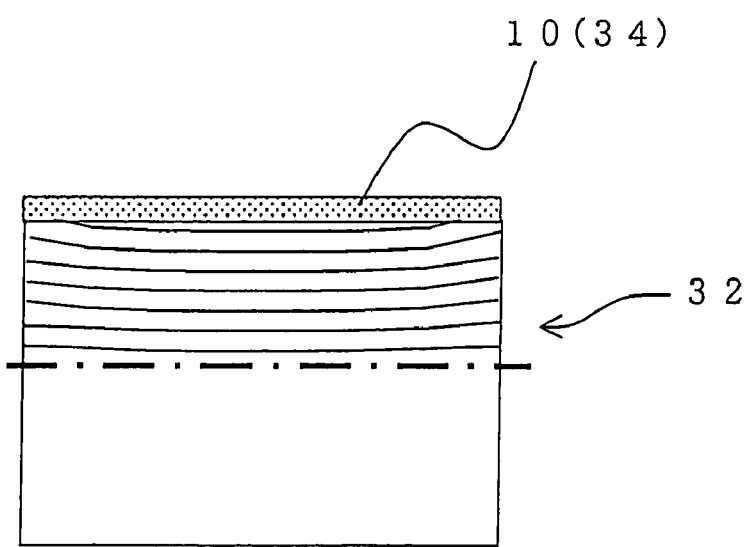

The honeycomb structures 31 shown in FIG. 14 to FIG. 22 can be obtained, for example, by, as shown in FIG. 23(a) and FIG. 23(b), removing the peripheral portion including the outer wall of a honeycomb structure precursor 32 (specific examples thereof are honeycomb structures explained in FIG. 1 to FIG. 23 and honeycomb formed bodies to be fired for production of these honeycomb structures), coating other material such as a coating material 34 for outer wall formation on the processed portion, and drying or firing the resulting honeycomb structure precursor to form an outer wall 9. Incidentally, the processing of the peripheral portion, shown in FIG. 23(a) can be conducted using a grinding wheel 33 or the like.

Figure 24:
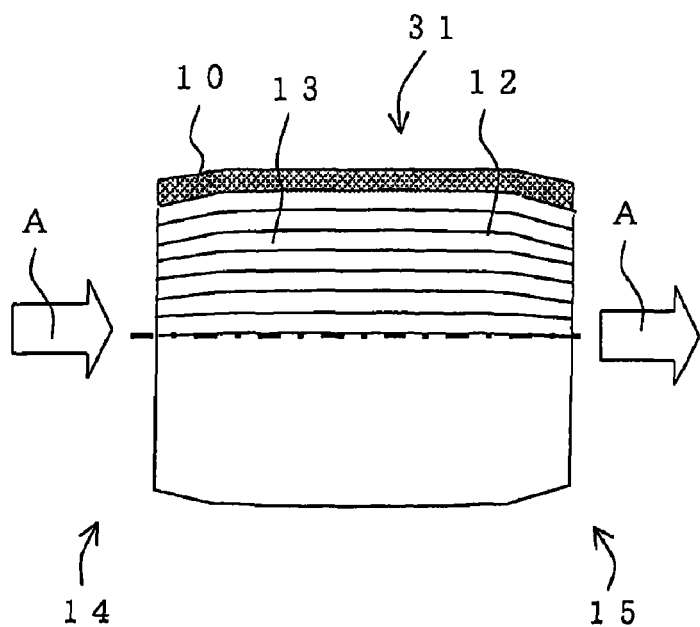
FIG. 24 is a partially sectional view schematically showing the constitution of one example of another embodiment of the honeycomb structure of the present invention (the first invention).
Figure 25:
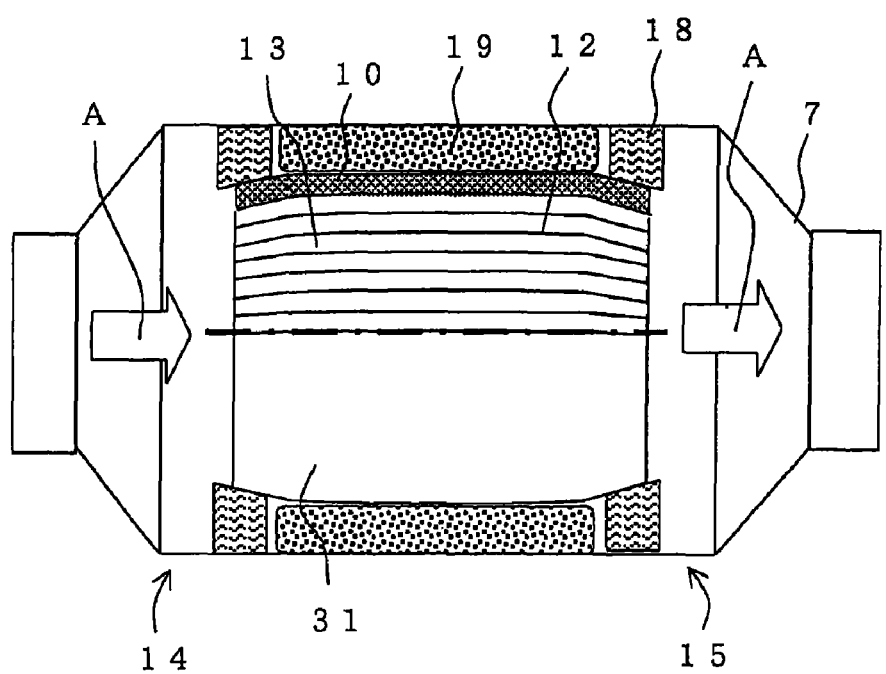
FIG. 25 is a partially sectional view showing a state in which another embodiment of the honeycomb structure of the present invention (the first invention) is housed in a container.

The honeycomb structure 31 of the present embodiment may also be a honeycomb structure 31 shown in FIG. 24, having an outer wall 9 formed by processing the peripheral portion of a honeycomb structure along the cells 13 and coating an outer wall material uniformly on the processed surface. In these honeycomb structures 31, the shapes of the peripheral portions are the same as those of the honeycomb structures shown in FIG. 1 to FIG. 13; therefore, in accommodating such a honeycomb structure 31 in a container 7 made of a metal or the like as shown in FIG. 25, a canning pressure can be applied uniformly to the peripheral portion of honeycomb structure 31 while the features of outer surface-coated type are utilized, and the temperature difference between the peripheral portion of honeycomb structure 31 and its inner portion can be made smaller and the breakage such as circumferential cracks or the like can be prevented effectively. Incidentally, the honeycomb structure 31 shown in FIG. 24 is obtained by processing the peripheral portion of the honeycomb structure 11 shown in FIG. 7, along the cells 13 and coating an outer wall material uniformly on the processed surface; however, the honeycomb structure to be processed may be a honeycomb structure of any of the above-described embodiments. Incidentally, in the honeycomb structure 31 shown in FIG. 24, the same elements as in the honeycomb structure 11 of FIG. 7 are provided with the same numerals as in the latter honeycomb structure 11, and no explanation is made for each numeral.

The shape of cell section of honeycomb structure, although not shown by drawing, is not restricted to a tetragon and may be, for example, other polygon such as triangle, hexagon, octagon, or a circle, or a combination of any of them. The thickness of partition wall is ordinarily about the same for all partition walls, but partition walls of different thicknesses may be intermingled. For example, the partition walls of peripheral portion of honeycomb structure may have a larger thickness so that the peripheral portion has a larger strength. In the honeycomb structures of the present embodiments, various known means for reinforcement may be employed. Also, all the cell opening ends at the peripheral portion of honeycomb structure may be plugged in order to prevent the chipping of cell corner. In this case, plugging may be conducted at the two end faces of honeycomb structure or only at either one end face.

The area of cell open end need not be the same for all cells, and cells of different open end areas may be intermingled. For example, the honeycomb structure of the present invention may contain cells of relatively large open end area and cells of relatively small open end area. Also in the honeycomb structure of the present invention, it is possible to place a filler material inside at least those cells not plugged with any plugging member, or form projections on the surface of partition wall, or make the surface roughness of partition wall larger, or bend the partition walls themselves, in order to control the gas passage resistance of cell. By this means, the capturability for particulate matter can be increased.

At the end face of gas inlet side, there may appear an erosion caused by solid foreign matters including iron oxide or bits of weld spatter contained in fluid such as exhaust gas) or by exhaust gas itself; therefore, the end face of gas inlet side is preferred to be reinforced. As the means for reinforcement, various known conventional techniques can be used. The reinforcement is preferably conducted by reinforcing both the portion of partition walls corresponding to the end face of gas inlet side and the plugging member.

There is no particular restriction, either, as to the sectional shape of honeycomb structure. The sectional shape may be various, for example, elliptic, elongated, oval, and polygonal such as approximately triangular or approximately tetragonal, as well as circular. These shapes may be adopted singly or in combination. When the plugging member is provided, it is ordinarily provided in a zigzag pattern in the open ends of a plurality of cells; however, there is no particular restriction as to the pattern in which the plugging member is provided, and the plugging member may be provided, for example, in rows or in a concentric or radial pattern, and a desired pattern may be selected depended upon the condition in which cells have been formed.

When the honeycomb structure of the present invention is used as a filter, there may be adopted, as the cell structure, a thin partition wall and a high cell density in order to improve the pressure loss by particulate matter and the capturability for particulate matter. Heretofore, there have been used cell structures of 10 to 30 mil in partition wall thickness and 50 to 350 cells/in$^2$ in cell density, such as a cell structure of 25 mil (0.64 mm) in partition wall thickness and 100 cells/in$^2$ in cell density (2.54 mm in cell pitch in case of square cell), a cell structure of 17 mil (0.43 mm) in partition wall thickness and 100 cells/in$^2$ in cell density (2.54 mm in cell pitch in case of square cell) and a cell structure of 12 mil (0.30 mm) in partition wall thickness and 300 cells/in$^2$ in cell density (1.47 mm in cell pitch in case of square cell). With a cell structure having a thinner partition wall and a higher cell density, that is, a partition wall thickness of 10 mil or less, preferably 8 mil or less and a cell density of 350 cells/in$^2$ or more, preferably 400 cells/in$^2$ or more, the surface area of partition wall with which an exhaust gas comes in contact, is larger; as a result, the flow rate of exhaust gas during filtration in filter decreases and the capturability for particulate matter can be increased. Further, when cell open end plugging is made at both end faces, a cell density of 600 cells/in$^2$ or less can prevent an excessive increase in pressure loss. Heretofore, the porosity of honeycomb structure has been 45 to 70% and the average pore diameter has been 15 to 40 μm. When there are used a conventional porosity range of 45 to 70% and a smaller average pore diameter of 15 μm or less, preferably 10 μm or less, the partition walls as a whole have an increased surface roughness and, as a result, the capturability for particulate matter can be increased. When there are used both a higher porosity and a smaller pore diameter, that is, a porosity of 70% or more, preferably 75% or more and an average pore diameter of 15 µm or less, preferably 10 µm or less, the partition walls as a whole have a further increased surface roughness and the capturability for particulate matter can be increased further. Also, with a higher porosity and a smaller pore diameter, the number of the effective pores though which an exhaust gas can pass, increases; as a result, the flow rate of exhaust gas during filtration decreases and the opportunity of contact of particulate matter with pore inner wall surface increases, whereby the capturability for particulate matter can be increased. The distribution of pores is preferred to be as sharp as possible. With a smaller pore diameter and a sharp distribution of pores, the capturability for particulate matter, especially for nanoparticles can be increased. Since the smaller pore diameter and the sharp distribution of pores are effective not only for capturing within partition walls but also for capturing on partition wall surfaces, the capturability increases as well in non-plugged cells. The reason is that a fine and uniform roughness is formed by pores on the partition wall surfaces. A smaller pore diameter and a sharp distribution of pores are also preferred because they give a larger strength. The sharpness of pore distribution can be quantitated by various expressions; therefore, it is not specified particularly. It can be quantitated by, for example, the standard deviation of distribution in the differential curve of pore diameter and pore volume or the ratio of 50% average pore diameter and 10%, 90% average pore diameters in the integral curve.

In the honeycomb structure wherein the open ends of given cells at one end face are blocked by a plugging member, cells provided with the plugging member and cells provided with no plugging member are intermingled. This constitution can be applied also to a ceramic honeycomb structure filter containing a honeycomb structure provided with the above-mentioned plugging member only at one end face. The plugging member is ordinarily provided in a zigzag pattern, but the pattern of plugging is not restricted thereto. For example, it is possible that a plurality of cells provided with the plugging member are assembled and a plurality of non-plugged cells are assembled as well; cells provided with the plugging member may be arranged in rows, or concentrically, or radially; thus, various patterns are possible depending upon the condition in which cells have been formed by partition walls.

In such a honeycomb structure, the open end area of cell need not be the same for all cells, and cells of different open end areas may be intermingled. For example, the honeycomb structure of the present invention may contain cells of relatively large open end area and cells of relatively small open end area. When the open end areas of all cells are the same, a fluid such as an exhaust gas easily enters cells provided with no plugging member, which have a relatively small gas resistance; as a result, the amount of gas entering cells provided with a plugging member decreases and the capturability of filter may be significantly reduced. Therefore, the reduction in the capturability of filter can be prevented by providing a plugging member in the outlet side cell open ends of relatively large area and providing no plugging member in the cell open ends of relatively small area.

In manufacturing the honeycomb structure by forming, there can be mentioned, as the method for forming, for example, extrusion forming, injection forming, press forming and a method for forming a ceramic material into a cylindrical shape and then making through-holes in the cylinder. However, extrusion forming is preferred because it makes continuous forming easy and allows for orientation of cordierite crystals to obtain a product of low thermal expansion coefficient. The direction of extrusion forming may be any of horizontal direction, vertical direction and oblique direction.

Extrusion forming can be conducted by using, for example, a ram extruder or a twin-screw continuous extruder. In extrusion forming, a die having a desired cell shape, a desired partition wall thickness and a desired cell density can be used to obtain a honeycomb formed body of desired honeycomb structure.

The material for the honeycomb structure is preferred, from the standpoint of strength, heat resistance, and the like, to be a ceramic material selected from cordierite, alumina, mullite, spinel, lithium aluminum silicate, aluminum titanate, titania, zirconia, silicon nitride, aluminum nitride, silicon carbide and LAS (lithium aluminum silicate); a composite thereof; or a material selected from stainless steel, aluminum alloy and adsorbent materials of active carbon, silica gel and zeolite. The material for the plugging member used for plugging of cell end can be selected in the same manner as in the case of the material for honeycomb structure, but it need not be the same as the material for honeycomb structure. However, use of the same material for plugging member is preferred, because, therefore the material for honeycomb structure and the material for plugging member have the same thermal expansion coefficient. The raw material for plugging member can be obtained by mixing a ceramic material, a pore former, a surfactant, water, and so on, into a slurry and then kneading the slurry using a mixer or the like.

In the above-mentioned embodiments of the present honeycomb structure, there were described those honeycomb structures obtained by forming the partition walls defining cells and the outer wall in one piece, or those honeycomb structures obtained by forming the outer wall on the peripheral portion of the partition walls. However, the present invention can be applied also to, for example, honeycomb structures of segments-connected type.

Next, description is made on an embodiment of the method for manufacturing a honeycomb structure, of the second invention. The method for manufacturing a honeycomb structure of the present embodiment is a method for manufacturing a honeycomb structure, which comprises forming a clay containing a forming material, as shown in FIG. 26(a) and FIG. 26(b), into a honeycomb shape to obtain a tubular honeycomb formed body 42 comprising a plurality of cells 43 each functioning as a fluid passage extending from one end face 44 of honeycomb formed body 42 to the other end face 45, and firing the honeycomb formed body 42 to obtain a honeycomb structure 41, wherein, as shown in FIG. 26(a), there is placed, on at least one end face 44 of the honeycomb formed body 42, a setter 47 made of a material having a contraction coefficient of firing (firing contraction coefficient) different from that of the honeycomb formed body 42 and, in this state, the honeycomb formed body 42 is fired to give rise to deformation, as shown in FIG. 26(b), in such a way that the areas of the sections of the individual cells 43 (cell sections) normal to the flow direction of fluid decrease gradually or increase gradually at each cell end at the setter 47-placed end face of honeycomb formed body 42, to obtain a honeycomb structure 41 wherein the areas of the sections of the individual cells 43 are so made as to be approximately equal to each other over a given range of the center of each cell 43 and its vicinity in the fluid flow direction and to decrease gradually or increase gradually at each cell 43 end of at least one end face 44 of honeycomb structure 41, in the fluid flow direction.

Thus, in the method for manufacturing a honeycomb structure of the present embodiment, the contact friction caused by the difference in firing contraction coefficient between the honeycomb formed material 42 and the setter 47 is utilized and the area of cell section of each cell 43, of the honeycomb formed body 42 is changed into a desired shape (decreased gradually or increased gradually), whereby a honeycomb structure 41 is obtained.

In the conventional method for manufacturing a honeycomb structure, a setter has been used in firing a honeycomb formed body, in order to prevent the reaction and consequent bonding between the honeycomb formed body and the setter. As the setter, there has been used a fired ceramic plate-shaped setter made of alumina, mullite or silicon carbide, or a thin disc-shaped setter which is made of the same material as for to-be-manufactured honeycomb structure and which has been obtained by cutting a fired honeycomb structure defective. Or, there has been a case of using a thin disc-shaped honeycomb setter obtained by cutting a honeycomb formed body of the same lot as a to-be-fired honeycomb formed body. In such a case, firing has been conducted with ceramic particles or a ceramic fiber sheet being interposed between the honeycomb formed body and the setter, for prevention of their tight adhesion to each other. In the conventional method for manufacturing of honeycomb structure, a setter has been used in order to prevent the deformation of honeycomb formed body, and the influence of firing contraction on honeycomb formed body and setter has been minimized; thus, there has been no thought of deforming the sectional area of each cell of honeycomb formed body into a desired shape using a setter.

Figure 26A:
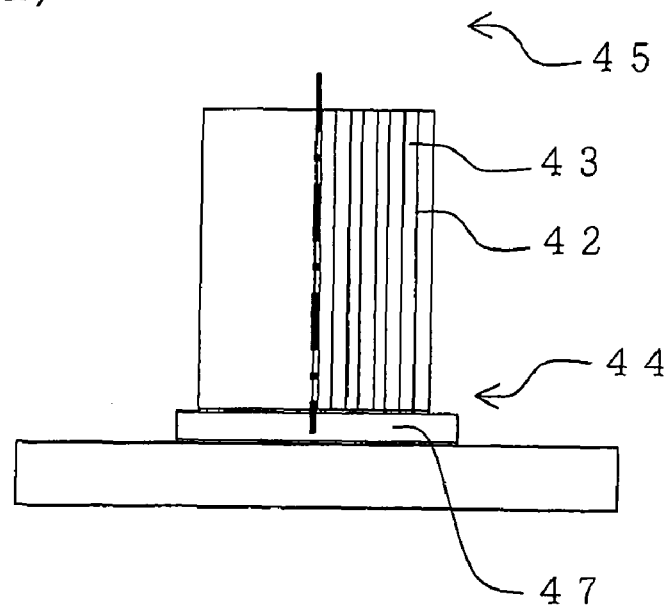
FIG. 26($a$) is a partially sectional view explaining one embodiment of the process for production of honeycomb structure, of the present invention (the second invention).
Figure 26B:
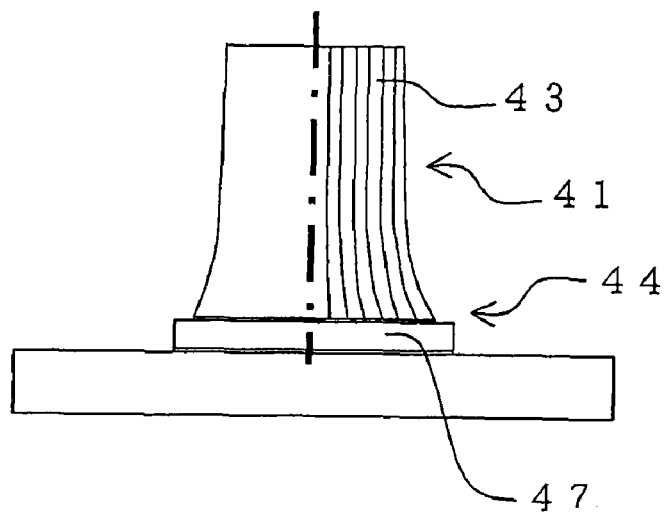

As shown in FIG. 26(a), in the method for manufacturing a honeycomb structure, of the present embodiment, the difference in firing contraction coefficient between the honeycomb fired body 42 and the setter 47 is controlled at a given level in such a range that no excessive change of outer diameter or cracking takes place due to a difference in firing contraction coefficient between the honeycomb formed body 42 and the setter 47, and, moreover, tight adhesion between the honeycomb formed body 42 and the setter 47 is avoided; in this state, the honeycomb formed body end of setter 47-placed end face 44 side is so deformed as to decrease gradually or increase gradually to obtain a honeycomb structure 41.

As the means for controlling, at a given level, the difference in firing contraction coefficient between the honeycomb formed body 42 and the setter 47, there can be mentioned, for example, use of a material for honeycomb fired body 42 and a material for setter 47 having different densities, use of different mixing proportions or different grain sizes for material components, use of a setter 47 which has been calcinated and the contraction of which has been progressed to a certain extent, and use of a fired honeycomb structure setter 47 whose cell diameters are smaller than the partition wall thickness of honeycomb formed body 42 and whose surface is rough. In this way, the honeycomb formed body 42 (honeycomb structure 41) is deformed at the end by about 25% or less of the axial direction length. Incidentally, the deformation may be, for example, linear gradual decrease or increase, or gradual decrease or increase with a desired curvature, at the end face 44 and its vicinity. There is a case in which the area of cell section changes slightly near the honeycomb center and its vicinity where the areas of cell sections are approximately equal to each other and changes with a very mild curvature at the honeycomb center and its vicinity; however, this change at the honeycomb center and its vicinity is a small dimensional change within the allowance of the dimension of honeycomb structure 41 and the areas of cell sections at the honeycomb center and its vicinity can be regarded to be substantially about the same. Incidentally, the allowance of the honeycomb structure 41 need not be restricted to a particular value but can be set, for example, at about ±2% or less of the basic outside diameter. There is no particular restriction, either, as to the length of the center and its vicinity of honeycomb structure where the areas of cell sections are about equal to each other, and the length may be such that a substantially sufficient pressure can be applied over the length with the use of the conventional canning technique.

In the method for manufacturing a honeycomb structure, of the present embodiment, the difference in firing contraction coefficient between the honeycomb formed body 42 and the setter 47 need be controlled in a given range so that there is no excessive change in outer diameter or no cracking owing to a large difference in firing contraction coefficient. The setter 47 is preferred to be a non-fired setter rather than a fired setter.

Figure 27A:
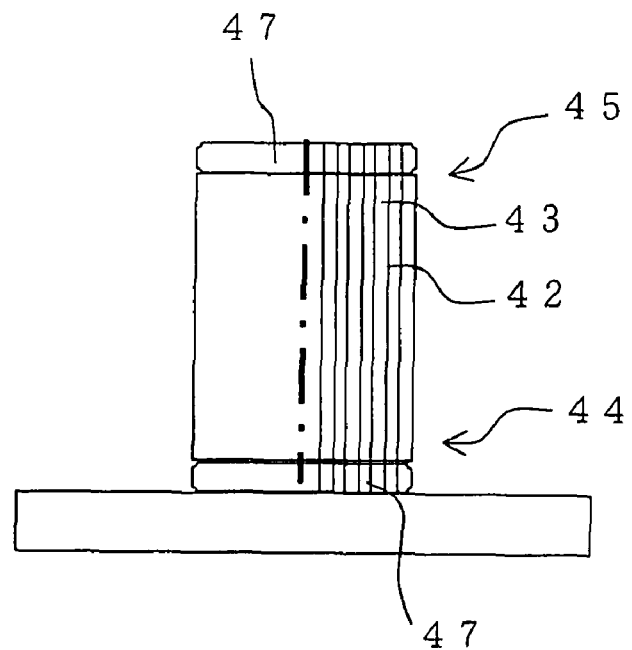
FIG. 27($a$) is a partially sectional view explaining another embodiment of the process for production of honeycomb structure, of the present invention (the second invention).
Figure 27B:
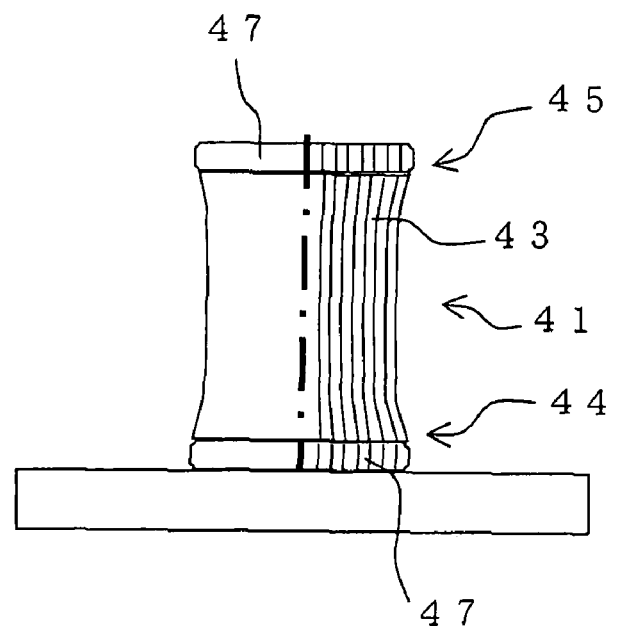

In the method for manufacturing a honeycomb structure of the present embodiment, when there is obtained a honeycomb structure 41 wherein the area of cell section decreases gradually or increases gradually at the cell ends of both end faces 44 and 45, in the flow direction of fluid, a setter 47 is placed on the both end faces 44 and 45 of honeycomb formed body 42, as shown in FIG. 27(a) and FIG. 27(b).

By the method for manufacturing a honeycomb structure, of the present embodiment, there can be easily obtained a honeycomb structure 41 wherein the areas of cell 43 sections are so made as to be about equal to each other over a given range of the center of each cell 43 and its vicinity in the flow direction of fluid and to decrease gradually or increase gradually at each cell 43 end of at least one end face 44 of honeycomb structure 41 in the fluid flow direction. According to the above-mentioned method, there can be easily obtained, for example, a cordierite-based honeycomb structure having square cells, a partition wall thickness of 0.11 mm, a cell density of 600 cells/in$^2$, an outer diameter of 90 mm and a length of 110 mm, whose both outer ends and vicinities thereof are enlarged over a length of 10 mm. This honeycomb structure having a basic outer diameter of 90 mm is enlarged, in the outer diameter, by about 5% on an average, at the both ends.

Figure 28A:
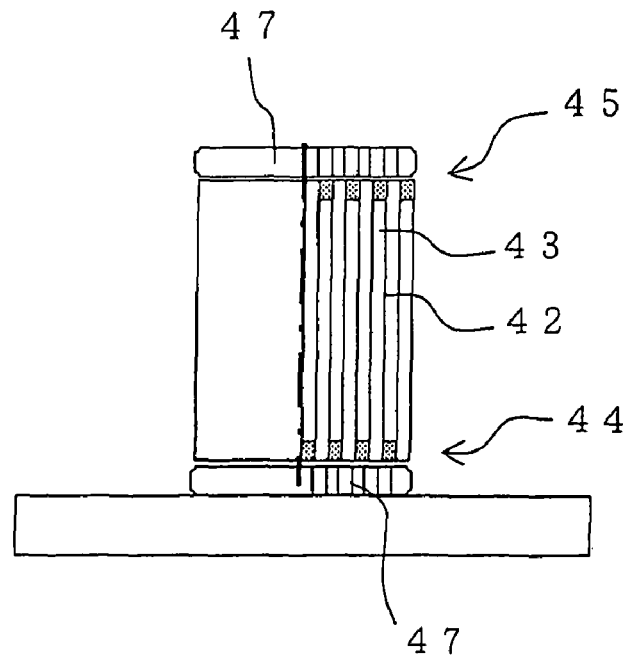
FIG. 28($a$) is a partially sectional view explaining one embodiment of the process for production of honeycomb structure, of the present invention (the second invention).
Figure 28B:
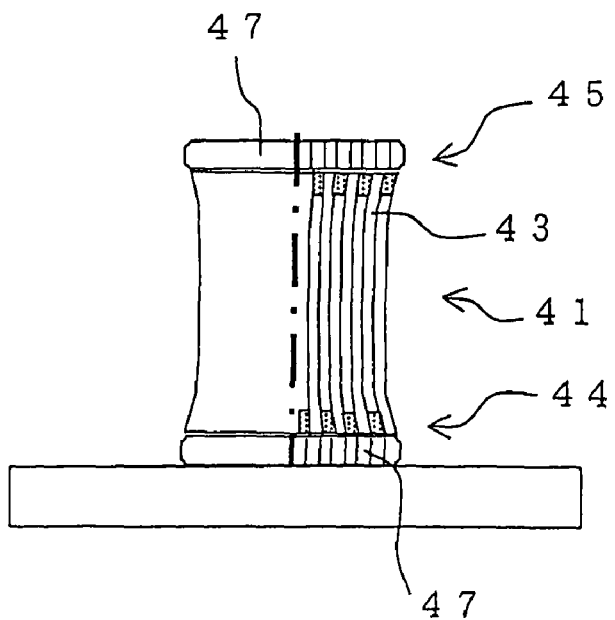
Figure 29A:
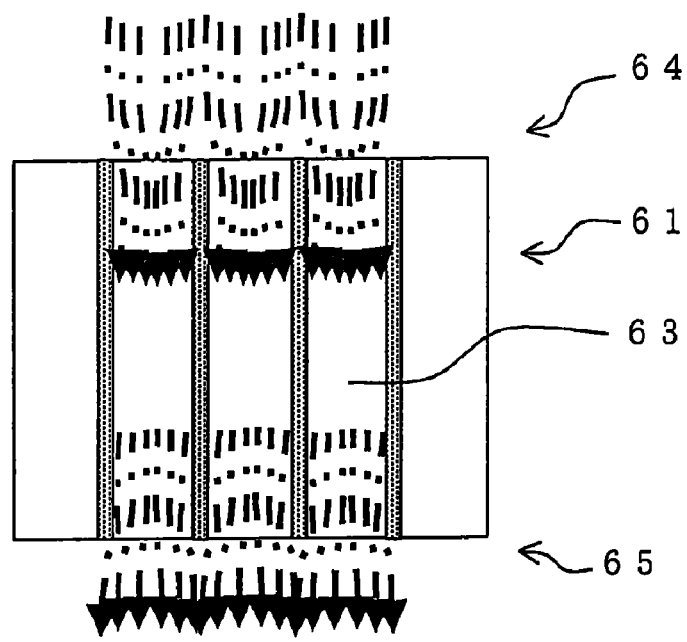
FIG. 29($a$) is a sectional view explaining a fluid flow in a conventional honeycomb structure.
Figure 29B:
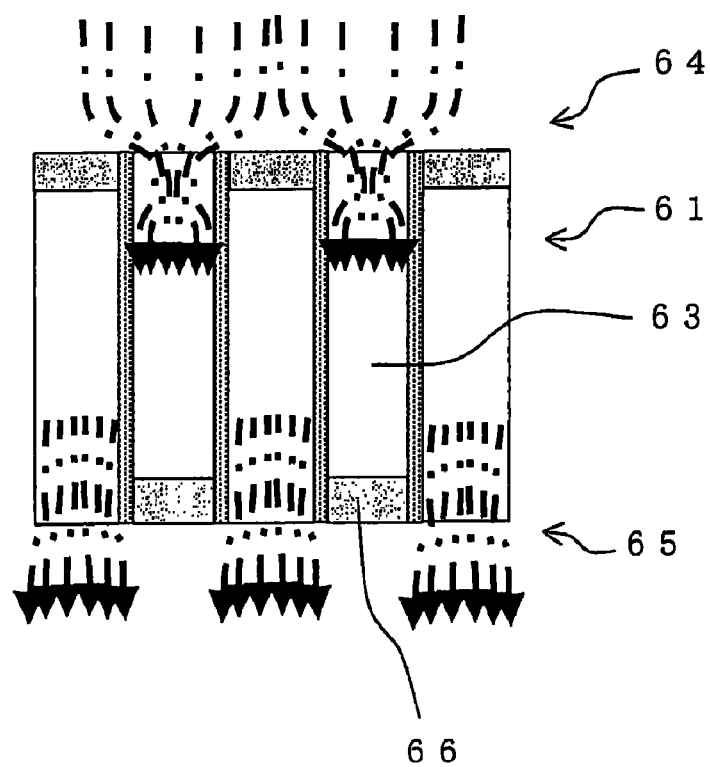

Next, description is made on an embodiment of the method for manufacturing a honeycomb structure, of the third invention. The method for manufacturing a honeycomb structure of the present embodiment is a method for manufacturing a honeycomb structure, which comprises forming a clay containing a forming material, as shown in FIG. 28(a) and FIG. 28(b), into a honeycomb shape to obtain a tubular honeycomb formed body 52 comprising a plurality of cells 53 each functioning as a fluid passage extending from one end face 54 of honeycomb formed body 52 to the other end face 55, and firing the honeycomb formed body 52 to obtain a honeycomb structure 51, wherein there is placed, in the open ends of given cells 53 at one end face 54 of honeycomb formed body 52, a plugging member 56 having a contraction coefficient of firing (firing contraction coefficient) different from that of honeycomb formed body 52 and, in this state, the honeycomb formed body 52 is fired to give rise to deformation in such a way that the areas of the sections of the individual cells 53 (cell sections) normal to the flow direction of fluid decrease gradually or increase gradually at each cell 53 end at the plugging member 56-placed end face 54 or 55 of honeycomb formed body 52, to obtain a honeycomb structure 51 wherein the areas of the sections of the individual cells 53 are made so as to be approximately equal to each other over a given range of the center of each cell 53 and its vicinity in the fluid flow direction and to decrease gradually or increase gradually at each cell 53 end of at least one end face 54 or 55 of honeycomb structure 51 in the fluid flow direction. Incidentally, in FIG. 28(a) and FIG. 28(b), there is shown a case wherein the plugging member 56 is provided at the both end faces 54 and 55 of honeycomb formed body 52 and the both ends of end faces 54 and 55 sides are so deformed as to decrease gradually or increase gradually; however, it is possible that the plugging member 56 is provided only at one end face 54 and the end of the end face 54 side is so deformed as to decrease gradually or increase gradually.

When a plugging member is provided in the conventional method for manufacturing a honeycomb structure, there has been employed a means for allowing the firing contraction coefficient of honeycomb formed body and that of plugging member to be about the same. As described above, in the method for manufacturing a honeycomb structure of the present embodiment, there is used a plugging member 56 having a firing contraction coefficient different from that of the honeycomb formed body 52, whereby the portion of honeycomb formed body 52, provided with the plugging member 56 is intentionally contracted or enlarged and the end of each cell 53 is so deformed as to decrease gradually or increase gradually. For example, when the firing contraction coefficient of honeycomb formed body 52 is larger than that of plugging member 56, the plugging member 56 is enlarged in relation to the honeycomb formed body 52 and the end of each cell 53 shows a gradual increase. Conversely, when the firing contraction coefficient of honeycomb formed body 52 is smaller than that of plugging member 56, the honeycomb formed body 52 is pulled by the contraction of the plugging member 56 and the end of each cell 53 shows a gradual decrease.

As the means for controlling, at a given level, the difference in firing contraction coefficient between the honeycomb formed body 52 and the plugging member 56, there can be mentioned, for example, use of different mixing proportions or different grain sizes for material components. Also, the difference in firing contraction coefficient varies depending upon the size or cell structure of product, or the depth of plugging member 56. Therefore, the difference in firing contraction coefficient need be determined appropriately in each case of honeycomb structure manufacture.

In the method for manufacturing a honeycomb structure of the present embodiment, the firing of honeycomb formed body may be conducted in a state that a setter 57 has been placed on the end face provided with a plugging member 56, as shown in FIG. 28(a) and FIG. 28(b).

Incidentally, firing cracks may appear when the difference in firing contraction coefficient between the honeycomb formed body 52 and the plugging member 56 is too large. Therefore, the difference in firing contraction coefficient between the honeycomb formed body 52 and the plugging member 56 is controlled preferably at 30% or less. For example, when the firing contraction coefficient of honeycomb formed body 52 is 1, the firing contraction coefficient of plugging member 56 is preferably 0.7 to 1.3. Since this range differs depending upon the size or cell structure of product, the depth of plugging member, or the like, the range need be determined appropriately in each case of firing.

By the method for manufacturing a honeycomb structure of the present embodiment, there can be easily obtained a honeycomb structure 51 wherein the areas of cell 53 sections are so made as to be about equal to each other over a given range of the center of each cell 53 and its vicinity in the flow direction of fluid and to decrease gradually or increase gradually at each cell 53 end of at least one end face 54 of honeycomb structure 51, in the fluid flow direction. Incidentally, when the honeycomb structure 51 is made of a silicon carbide ceramic, there is no orientation of the material and there is no problem; however, there is orientation of material when the honeycomb structure 51 is made of a cordierite ceramic, and the plugging member 56 shows no orientation, therefore, in this case, care must be taken in manufacture of honeycomb structure. According to the above-mentioned method, there can be easily obtained, for example, a cordierite-based honeycomb structure having square cells, a partition wall thickness of 0.30 mm, a cell density of 300 cells/in$^2$, an outer diameter of 143 mm and a length of 152 mm, wherein the depth of plugging (the length of plugging in the flow direction of fluid) is 5 mm and whose two end faces and vicinities thereof are enlarged over a length of about 15 mm. This honeycomb structure having a basic outer diameter of 143 mm is enlarged, in the outer diameter, by about 10% on an average, at the two ends.

In the method for manufacturing a honeycomb structure, of the present embodiment, the honeycomb formed body 52 is first fired, then a plugging member 56 is placed, thereafter refiring is conducted, whereby a difference in firing contraction coefficient can be generated. This is because, in the refiring conducted after firing of honeycomb formed body 52 and subsequent placement of plugging member 56, the dimensional change of honeycomb formed body 52 is very small and its firing contraction coefficient can always be regarded to be substantially 1. Prior firing of honeycomb formed body 52 makes the integration between honeycomb formed body 52 and plugging member 56 very hard; when the firing contraction coefficient of plugging member 56 is over 1, a gap is generated between the honeycomb formed body 52 and the plugging member 56 and, when the firing contraction coefficient of plugging member 56 is below 1, a force appears so as to widen the cells 53 of honeycomb formed body 52. Therefore, the above two-step firing is applicable in manufacturing of a honeycomb structure having an enlarged end (ends) but, in manufacturing a honeycomb structure having a contracted end (ends), is not preferred because a gap may be formed between each cell and the plugging member 56.

EXAMPLES

The present invention is described more specifically below by way of Examples. However, the present invention is in no way restricted to these Examples.

As the main material for forming a honeycomb formed body, there is preferably used a heat-resistant, low thermal expansion coefficient, cordierite-based ceramic material which is a composition comprising 0 to 20% by mass of kaolin ($Al_2O_3.2SiO_2.2H_2O$) having an average particle diameter of 5 to 10 μm, 37 to 40% by mass of talc ($3MgO.4SiO_2.H_2O$) having an average particle diameter of 15 to 30 μm, 15 to 45% by mass of aluminum hydroxide having an average particle diameter of 1 to 10 μm, 0 to 15% by mass of aluminum oxide having an average particle diameter of 4 to 8 μm, and 10 to 20% by mass of fused silica or quartz having an average particle diameter of 3 to 100 μm. To the above ceramic material may be added desired additives as necessary. As the additives, there can be mentioned a binder, a surfactant for promoting the dispersion in liquid medium, a pore former, and so on. As the binder, there can be mentioned, for example, hydroxypropyl methyl cellulose, methyl cellulose, hydroxyethyl cellulose, carboxymethyl cellulose, polyvinyl alcohol, polyethylene terephthalate, wax and agar. As the surfactant, there can be mentioned, for example, ethylene glycol, dextrin, fatty acid soap and polyalcohol. The addition amount of the surfactant is preferably 0.1 to 5 parts by mass relative to 100 parts by mass of the ceramic material. As the pore former, there can be mentioned, for example, graphite, coke, wheat flour, starch, foamed resin, water-absorbing resin, phenolic resin, polyethylene terephthalate, fly ash balloon, shirasu balloon, silica balloon, alumina gel, silica gel, organic fiber, inorganic fiber and hollow fiber. These additives can be used singly or in combination of two or more kinds depending upon the purpose. Incidentally, the binder, surfactant and pore former contained in the plugging member can be selected in the same manner as in the above-mentioned honeycomb formed structure.

Ordinarily, the above-mentioned main material and additives added as necessary are mixed; to 100 parts by mass of the resulting mixture (powder) is added about 10 to 40 parts by mass of water; and kneading is conducted to obtain a plastic mixture. Extrusion forming can be conducted by using a vacuum pug mill, a ram type extrusion molding apparatus or the like. As the external form of the honeycomb formed body to be obtained, there can be mentioned, for example, a cylinder whose end faces are a true circle or an oval, a prism whose end faces are a polygon such as a triangle or a tetragon, and such a cylinder or prism having a dogleg side face. As for the cell shape of the honeycomb formed body, there can be mentioned, for example, a polygon such as a tetragon or an octagon, a true circle and an oval. As to the means for drying the thus-obtained honeycomb formed body, there is no particular restriction. However, there can be mentioned, for example, hot air drying, microwave drying, dielectric drying, reduced pressure drying, vacuum drying and freeze-drying, and drying can be conducted by any of these methods. A combination of microwave drying and hot-air drying, or a combination of dielectric drying and hot-air drying is preferred. The drying conditions are preferably 80 to 150° C. and 10 to 60 minutes. Besides, there can be used special methods such as freeze-drying, reduced pressure drying, vacuum drying, far infrared drying and the like. Next, the dried honeycomb formed body is cut at the two end faces so as to have a desired length.

Next, a plugging member is provided as necessary at the open ends of given cells of the above-obtained honeycomb formed body. First, in a masking step, a film is applied to the end face(s) of the honeycomb formed body. A polyester film is used as the film. On one side of the film a pressure-sensitive adhesive is coated, and the coated side of the film is applied onto the end face(s) of the honeycomb formed body. Then, by using a NC-scanning type laser apparatus, holes are made in a zigzag pattern in the polyester film at the film portions corresponding to the cell open ends. When the holes have been made, the periphery of each pore formed rises up owing to the melting of the film.

As the main material for the plugging member, there is preferred, for a small difference in thermal expansion coefficient between the main material and the honeycomb formed body, a heat-resistant, low thermal expansion coefficient, cordierite-based ceramic material which is a composition comprising 0 to 20% by mass of kaolin having an average particle diameter of 1 to 20 μm, 37 to 40% by mass of talc having an average particle diameter of 5 to 60 μm, 15 to 45% by mass of aluminum hydroxide having an average particle diameter of 0.5 to 20 μm, 0 to 15% by mass of aluminum oxide having an average particle diameter of 1 to 20 μm, and 10 to 20% by mass of fused silica or quartz having an average particle diameter of 1 to 200 μm. In order to match the firing contraction coefficient of the plugging member with that of the honeycomb formed body, the mixing proportions and particle diameters of the ceramic material components are varied in given ranges while the formulation of the ceramic material is maintained. A honeycomb formed body is formed and fired; the firing contraction coefficient thereof is measured; and the mixing proportions and particle diameters of the ceramic material components for the plugging member are adjusted so that the firing contraction coefficient of the plugging member matches the measured firing contraction coefficient of the honeycomb formed body. The adjustment is conducted mainly by the silica component. With addition of an appropriate amount of the above-mentioned pore former to the plugging member, the porosity of the plugging member can be adjusted and the firing contraction coefficient thereof can also be adjusted. At first, the firing contraction coefficient of the plugging member is adjusted on try-and-error basis, but its repetition and experience enables prediction of the coefficient. In the present Examples, control was so made that the end(s) of the honeycomb structure manufactured were enlarged or contracted in a range of within about 30% of the basic outer diameter of honeycomb structure. Incidentally, this value is merely a yardstick and the honeycomb structure of the present invention is not restricted thereto.

Next, a filling step is conducted. To the cordierite material, water, a binder, a dispersing agent, and the like are added to prepare a slurry having about 200 dPa·s; the consequent slurry is placed in a container for conducting plugging; a honeycomb formed body with a film having holes of zigzag pattern is forced into the container under pressure; the slurry in the container is injected into the open ends of given cells through the film holes. After the completion of the injection, the honeycomb formed body is taken out of the container. The filling depth (the filling length in fluid flow direction in cell) of the slurry was 5 mm. In this case, a known means for reinforcing the inlet side end face may be employed in order to increase the erosion resistance of the inlet side end face.

Next, in order to dry the slurry filled in the open ends of given cells, hot air of 120° C. is applied to the end face(s) of the honeycomb formed body to conduct drying for about 5 minutes without peeling the film. The drying is possible with a hot air feeder, a hot plate or a far-infrared dryer. Then, firing is conducted, whereby a cordierite-based honeycomb structure provided with a plugging member is obtained. The firing was conducted at 1,410 to 1,440° C. for about 5 hours. Ordinarily, firing can be conducted using a single furnace or a continuous furnace such as a tunnel. The temperature elevation rate and the cooling rate need be optimized depending upon the size of the honeycomb formed body to be fired, in order to uniformize the temperature distribution within product and realize the uniform firing contraction and uniform cooling contraction within product; therefore, the temperature elevation rate and the cooling rate are very important factors in manufacturing of honeycomb structure.

Thus was obtained a cordierite-based honeycomb structure (honeycomb filter) provided with a plugging member (porosity: 60%, average pore diameter: 25 μm; diameter: 191 mm; length: 203 mm; partition wall thickness: 300 μm; cell density: 300 cells/in$^2$). The honeycomb filter was measured for average thermal expansion coefficient of 40 to 800° C., which was $0.6 \times 10^{-6}$/° C. at the partition wall portion and $0.8 \times 10^{-6}$/° C. at the plugging member. Various specifications of the honeycomb structures (Examples 1 to 35) obtained in the present Examples are shown in Table 1 and Table 2.

TABLE 1

|  | Porosity (%) | Average pore diameter (μm) | Cell structure | | Appearance of honeycomb structure | |
|---|---|---|---|---|---|---|
|  |  |  | Partition wall thickness (mm) | Cell density (cells/in$^2$) | Outer diameter (mm) | Length (mm) |
| Example 1 | 58 | 21 | 0.30 | 300 | 143 | 152 |
| Example 2 | 65 | 23 | 0.30 | 300 | 143 | 152 |
| Example 3 | 61 | 22 | 0.30 | 300 | 191 | 203 |
| Example 4 | 59 | 21 | 0.30 | 300 | 229 | 254 |
| Example 5 | 66 | 25 | 0.30 | 300 | 267 | 305 |
| Example 6 | 61 | 24 | 0.30 | 300 | 191 | 90 |
| Example 7 | 52 | 13 | 0.30 | 300 | 229 | 80 |
| Example 8 | 49 | 11 | 0.42 | 100 | 143 | 152 |
| Example 9 | 48 | 12 | 0.64 | 100 | 143 | 152 |
| Example 10 | 64 | 22 | 0.30 | 280 | 143 | 152 |
| Example 11 | 65 | 23 | 0.24 | 350 | 143 | 152 |
| Example 12 | 65 | 23 | 0.20 | 400 | 143 | 152 |
| Example 13 | 71 | 14 | 0.20 | 400 | 143 | 152 |
| Example 14 | 71 | 14 | 0.20 | 400 | 143 | 70 |
| Example 15 | 76 | 9 | 0.20 | 450 | 143 | 152 |
| Example 16 | 78 | 8 | 0.20 | 500 | 143 | 152 |
| Example 17 | 83 | 6 | 0.15 | 600 | 143 | 152 |
| Example 18 | 83 | 6 | 0.10 | 600 | 143 | 152 |

TABLE 2

|  | Porosity (%) | Shape of cell section | Cell structure | | Appearance of honeycomb structure | |
|---|---|---|---|---|---|---|
|  |  |  | Partition wall thickness (mm) | Cell density (cells/in$^2$) | Outer diameter (mm) | Length (mm) |
| Example 19 | 46 | Tetragon | 0.17 | 400 | 191 | 178 |
| Example 20 | 46 | Hexagon | 0.17 | 400 | 191 | 178 |
| Example 21 | 36 | Tetragon | 0.17 | 400 | 191 | 178 |
| Example 22 | 36 | Hexagon | 0.17 | 400 | 191 | 178 |
| Example 23 | 36 | Tetragon | 0.12 | 300 | 191 | 178 |
| Example 24 | 34 | Tetragon | 0.11 | 400 | 90 | 110 |
| Example 25 | 34 | Tetragon | 0.11 | 600 | 90 | 110 |
| Example 26 | 33 | Tetragon | 0.90 | 400 | 90 | 110 |
| Example 27 | 33 | Tetragon | 0.90 | 600 | 90 | 110 |
| Example 28 | 33 | Hexagon | 0.90 | 600 | 90 | 110 |
| Example 29 | 33 | Tetragon | 0.70 | 600 | 90 | 110 |
| Example 30 | 33 | Tetragon | 0.50 | 600 | 90 | 110 |
| Example 31 | 33 | Tetragon | 0.50 | 900 | 90 | 110 |
| Example 32 | 22 | Tetragon | 0.25 | 900 | 90 | 110 |
| Example 33 | 23 | Tetragon | 0.25 | 900 | 70 | 90 |
| Example 34 | 31 | Tetragon | 0.25 | 1200 | 70 | 90 |
| Example 35 | 31 | Tetragon | 0.25 | 1600 | 70 | 90 |

INDUSTRIAL APPLICABILITY

The honeycomb structure of the present invention is suitably used as a carrier of catalyst for purification of internal combustion engine exhaust gas including automobile exhaust gas, a carrier of catalyst for deodorization, a filter for filter equipment, a heat exchanger unit, or a carrier for chemical reactor such as a carrier of reforming catalyst for fuel cell. The method for manufacturing a honeycomb structure of the present invention can easily manufacture the honeycomb structure of the present invention.

The invention claimed is:

1. A tubular honeycomb structure comprising partition walls which define and form a plurality of cells each functioning as a fluid passage extending from a first end face of the honeycomb structure to a second end face, wherein areas of sections of the individual cells (cell sections) normal to a flow direction of fluid are made so as to be approximately equal to each other over a given range of a center of each cell and a vicinity of the center of each cell in the fluid flow direction and to gradually decrease or gradually increase at each cell end of at least one end face of the honeycomb structure in the fluid flow direction, wherein an outer diameter of the honeycomb structure at least at one end face of the honeycomb structure is made so as to gradually decrease or gradually increase by more than ±0.5% of an outer diameter of the honeycomb structure at a center of the honey comb structure and a vicinity of the center of the honeycomb structure.

2. A honeycomb structure according to claim 1, further comprising a plugging member which plugs open ends of given cells at the first end face of the honeycomb structure and open ends of residual cells at the second end face.

3. A honeycomb structure according to claim 1, further comprising an outer wall which covers a peripheral portion of the partition walls defining and forming the plurality of cells.

4. A honeycomb structure according to claim 1, wherein the areas of the sections of individual cells are made so as to gradually decrease or gradually increase at each cell end at the two end faces of the honeycomb structure in the fluid flow direction.

5. A honeycomb structure according to claim 1, wherein the areas of the sections of all cells are made so as to gradually increase or gradually decrease at least at one end face of the honeycomb structure.

6. A honeycomb structure according to claim 1, wherein the areas of the cell sections are made so as to gradually decrease or gradually increase at the end of the honeycomb structure having a length which is 25% or less of an axial direction length of the honeycomb structure.

7. A tubular honeycomb structure comprising partition walls which define and form a plurality of cells each functioning as a fluid passage extending from a first end face of the honeycomb structure to second end face, wherein areas of sections of the individual cells (cell sections) normal to a flow direction of fluid are made so as to be approximately equal to each other over a given range of a center of each cell and a vicinity of the center of each cell in the fluid flow direction and to gradually decrease or gradually increase at each cell end of at least one end face of the honeycomb structure in the fluid flow direction,
wherein the areas of the cell sections are made so as to gradually decrease or gradually increase at an end of the honeycomb structure having a length which is 25% or less of an axial direction length of the honeycomb structure.

8. A honeycomb structure according to claim 7, wherein an outer diameter of the honeycomb structure at least at one end face of the honeycomb structure is made so as to gradually decrease or gradually increase by more than ±0.5% of an outer diameter of the honeycomb structure at a center of the honeycomb structure and a vicinity of the center of the honeycomb structure.

9. A honeycomb structure according to claim 7, further comprising a plugging member which plugs open ends of given cells at the first end face of the honeycomb structure and open ends of residual cells at the second end face.

10. A honeycomb structure according to claim 7, further comprising an outer wall which covers a peripheral portion of the partition walls defining and forming the plurality of cells.

11. A honeycomb structure according to claim 7, wherein the areas of the sections of individual cells are made so as to gradually decrease or gradually increase at each cell end at the two end faces of the honeycomb structure in the fluid flow direction.

12. A honeycomb structure according to claim 7, wherein the areas of the sections of all cells are made so as to gradually increase or gradually decrease at least at one end face of the honeycomb structure.

* * * * *